United States Patent
Ackerman et al.

(10) Patent No.: US 11,480,973 B2
(45) Date of Patent: Oct. 25, 2022

(54) ROBOTIC MOWER BOUNDARY DETECTION SYSTEM

(71) Applicant: Deere & Company, Moline, IL (US)

(72) Inventors: Chad A. Ackerman, Urbana, IL (US);
Nathan Ogden, Mahomet, IL (US);
Brittany Sprabery, Sunnyvale, CA (US); Blake Heltsley, Urbana, IL (US);
Patrick Feltes, Champaign, IL (US);
Aaron Trask, Fairfax, VA (US); Mark D. Moran, Urbana, IL (US)

(73) Assignee: Deere & Company, Moline, IL (US)

( * ) Notice: Subject to any disclaimer, the term of this patent is extended or adjusted under 35 U.S.C. 154(b) by 422 days.

(21) Appl. No.: 16/511,511

(22) Filed: Jul. 15, 2019

(65) Prior Publication Data
US 2021/0018927 A1    Jan. 21, 2021

(51) Int. Cl.
G05D 1/02    (2020.01)
A01D 34/00   (2006.01)
A01D 101/00  (2006.01)

(52) U.S. Cl.
CPC ......... *G05D 1/0246* (2013.01); *A01D 34/008* (2013.01); *G05D 1/0268* (2013.01); *G05D 1/0278* (2013.01); *A01D 2101/00* (2013.01); *G05D 2201/0208* (2013.01)

(58) Field of Classification Search
CPC .. G05D 1/0246; G05D 1/0268; G05D 1/0278; G05D 2201/0208; G05D 1/0221; A01D 34/008; A01D 2101/00
See application file for complete search history.

(56) References Cited

U.S. PATENT DOCUMENTS

| | | | |
|---|---|---|---|
| 8,706,297 B2 * | 4/2014 | Letsky | A01D 34/008 700/245 |
| 8,731,295 B2 | 5/2014 | Schepelmann et al. | |
| 10,091,930 B2 | 10/2018 | Balutis et al. | |

(Continued)

FOREIGN PATENT DOCUMENTS

| | | |
|---|---|---|
| EP | 3018548 A1 | 5/2016 |
| EP | 3508937 A1 | 7/2019 |
| WO | WO 2017008523 A1 | 1/2017 |

OTHER PUBLICATIONS

Tim Moynihan, "The Next Roomba May Recognize All Your Crap", May 24, 2015, 11 pages.

(Continued)

*Primary Examiner* — Jeff A Burke
*Assistant Examiner* — Sihar A Karwan
(74) *Attorney, Agent, or Firm* — Christopher J. Volkmann; Kelly, Holt & Christenson, PLLC

(57) ABSTRACT

A computer-implemented method includes obtaining image data representing a set of images of a worksite captured by an image capture component of a mobile computing device, identifying a set of virtual markers associated with the set of images, each virtual marker having a corresponding position in one of the images, and determining, for each virtual marker, a set of coordinates in a coordinate system based on the corresponding position of the virtual marker. Based on the set of coordinates, boundary data is generated that represents a boundary on the worksite. The boundary data is communicated to a robotic mower for control of the robotic mower within an operating area defined based on the boundary.

20 Claims, 21 Drawing Sheets

(56) References Cited

U.S. PATENT DOCUMENTS

| | | | |
|---|---|---|---|
| 10,853,882 B1* | 12/2020 | Leise | G06V 20/46 |
| 2011/0153136 A1 | 6/2011 | Anderson | |
| 2011/0295423 A1 | 12/2011 | Anderson | |
| 2016/0129593 A1* | 5/2016 | Wolowelsky | G05D 1/0246 |
| | | | 901/1 |
| 2016/0165795 A1* | 6/2016 | Balutis | G05D 1/0265 |
| | | | 701/25 |
| 2016/0308954 A1 | 10/2016 | Wilbur et al. | |
| 2017/0364088 A1 | 12/2017 | Grufman et al. | |

OTHER PUBLICATIONS

European Search Report issued in counterpart application No. 20181961.2 dated Nov. 18, 2020 (07 pages).

* cited by examiner

ROBOTIC MOWER BOUNDARY DETECTION SYSTEM

FIELD OF THE DESCRIPTION

The present description generally relates to control systems for autonomous robots or other autonomous machines. More specifically, but not by limitation, the present description relates to a boundary detection system for a robotic mower.

BACKGROUND

There are a wide variety of different types of autonomous machines. One example is a robotic mower that operates autonomously to cut grass, grain, etc. on a worksite.

Some robotic mowers include navigation systems that utilize a boundary sensing system within sensing assemblies for sensing a boundary of the worksite, such as a residential or commercial lawn, to be mowed. Typically, the boundary sensing system detects a boundary wire signal marking the boundary of an area to be mowed. The boundary sensing system may detect when the robotic mower has reached the boundary wire. When the robotic mower reaches the boundary wire, a vehicle control unit may, for example, prompt the drive system of the mower to stop and to make a turn.

The discussion above is merely provided for general background information and is not intended to be used as an aid in determining the scope of the claimed subject matter.

SUMMARY

A computer-implemented method includes obtaining image data representing a set of images of a worksite captured by an image capture component of a mobile computing device, identifying a set of virtual markers associated with the set of images, each virtual marker having a corresponding position in one of the images, and determining, for each virtual marker, a set of coordinates in a coordinate system based on the corresponding position of the virtual marker. Based on the set of coordinates, boundary data is generated that represents a boundary on the worksite. The boundary data is communicated to a robotic mower for control of the robotic mower within an operating area defined based on the boundary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present disclosure generally relates to control systems for autonomous robots or other autonomous machines. Examples of autonomous machines perform a wide variety of different operations or tasks with a high degree of autonomy. Some autonomous machines perform aerial operations, while other machines may perform nautical or under water operations, and some autonomous machines perform ground-based operations, such as agricultural, construction, and/or turf and forestry operations. For the sake of the present discussion, examples will be described in the context of a robotic mower that performs mowing operations on a worksite, such as, but not limited to, a residential or commercial yard. Of course, this is for sake of illustration only, and other types of machines can perform other types of autonomous or semi-autonomous operations.

Figure 1:
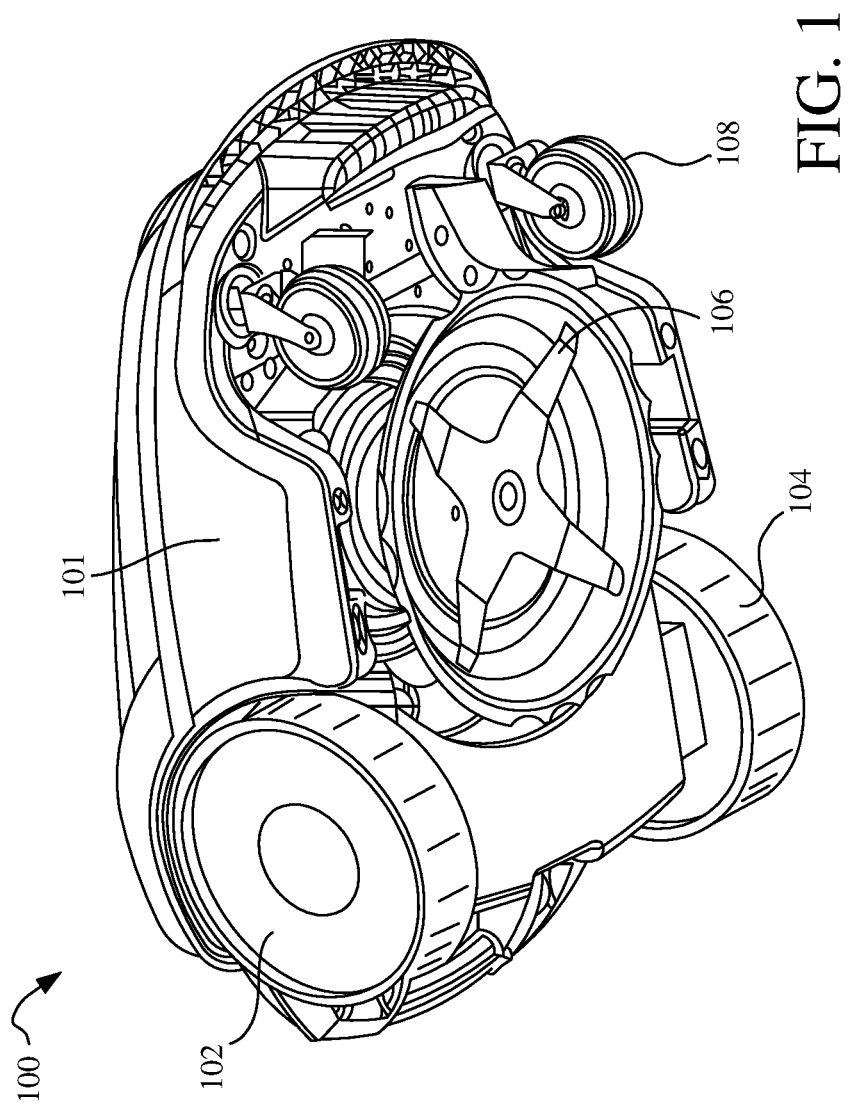
FIG. 1 illustrates one example of a robotic mower that is configured to perform mowing operations on a worksite.

FIG. 1 illustrates one example of a robotic mower 100 that is configured to perform mowing operations on a worksite. Robotic mower 100 is powered by a battery pack or other power source that can be charged periodically at a charging station. In one example, the battery pack can include one or more lithium ion batteries disposed within a housing 101. A vehicle control unit, or other control system, controls the functions of robotic mower 100. For example, a vehicle control unit can control one or more motors to turn traction wheels 102 and 104. The control unit can also control a blade motor to rotate a cutting blade or blades 106 that is supported by a cut adjustment assembly that is mounted to a bottom chassis and is adjustable to set a cutting height of blades 106. Robotic mower 100 include a pair of front wheels 108 (illustratively, swivel caster wheels).

In one example, the vehicle control unit include a processor that executes instructions stored in memory to control the various functions of mower 100. In one example, the vehicle control unit can be a printed circuit board assembly that serves as a main control board for the robotic mower. In any case, the control system receives and process information from various sensors, and uses that information to control and operate the motors that drive traction wheels 102 and 104 to control forward and reverse motion of mower 100, as well as to turn robotic mower 100 along a desired path on the worksite. A vehicle control unit can also be connected to a user interface module, such as a display device having input mechanisms (such as buttons, keys, etc.) for operator input and output devices such as display devices, indicator lights, etc. for indicating status information and the like. Robotic mower 100 can also include a contact detection systems that detect contact and controls robotic mower 100.

The navigation system of robotic mower 100 utilizes a boundary sensing system to sense a boundary of the worksite. Illustratively, the boundary defines a keep-out zone or zones for operation of robotic mower 100. Thus, in contrast to route planning in which a route of a machine is planned, boundary detection and control constrains the operation of the machine and identifies areas that the machine is to avoid. In the case of a commercial or residential worksite, this can be an adjacent yard, areas of landscaping, a sidewalk or street, etc. The boundary sensing system detects the boundary of a residential yard within which robotic mower 100 is controlled to make a number of passes to cover the entire area of the yard.

Some boundary sensing systems utilize boundary wires that are physically buried on the worksite and are detected by sensing assemblies of the boundary sensing system. Use of boundary wires is burdensome as it requires the initial step of installing the boundary wire and subsequent maintenance (i.e., in the case of failures where the boundary wire may be severed or otherwise malfunction). Further yet, the use of boundary wires is resistant to changing worksite areas. For instance, to change the boundary of the worksite, the boundary wire must be physically dug up and moved, and/or additional boundary wire must be buried.

Figure 2:
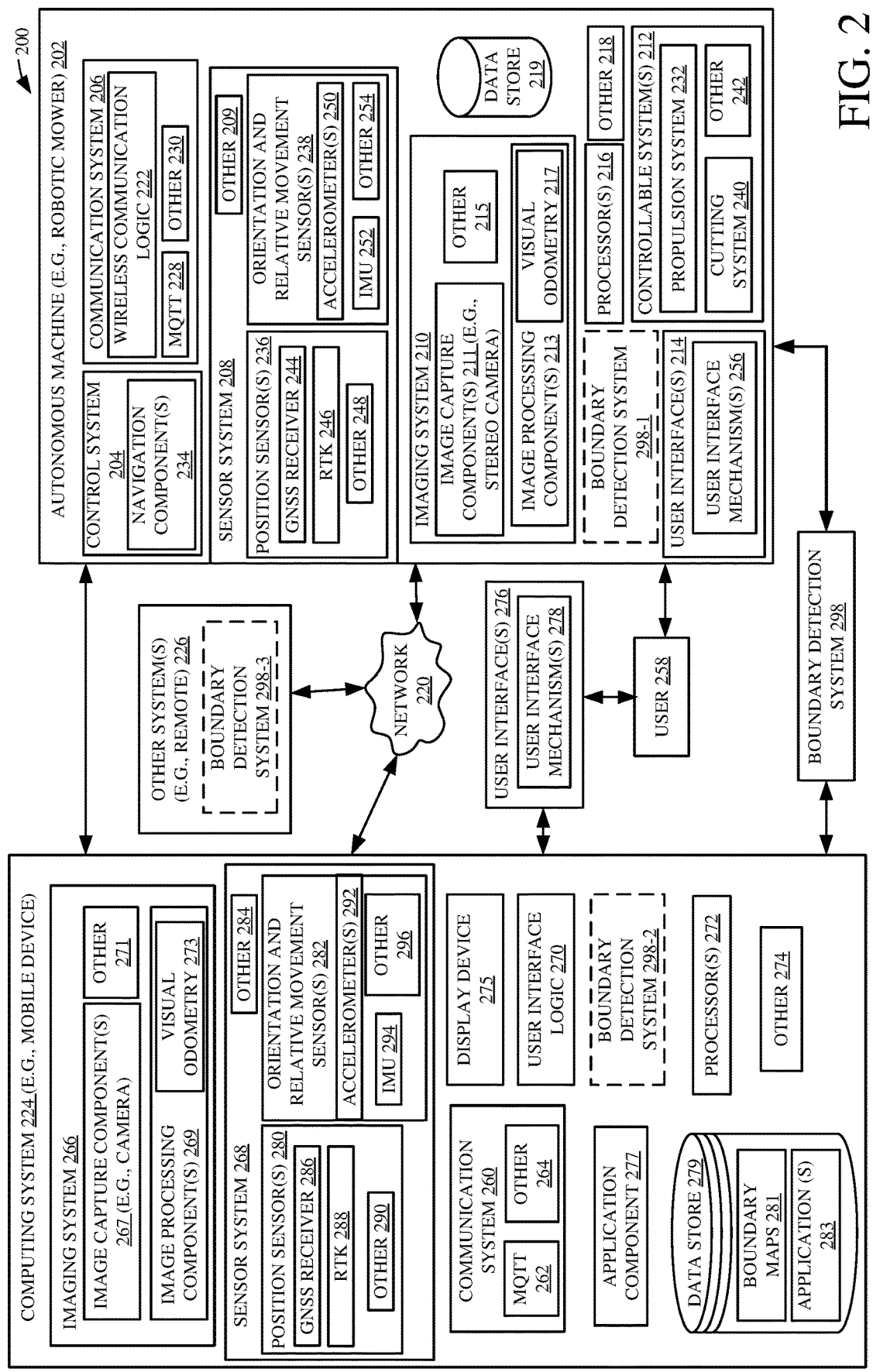
FIG. 2 is a block diagram showing one example of a computing system architecture for an autonomous machine.

FIG. 2 is a block diagram showing one example of a computing system architecture 200 for an autonomous machine, such as robotic mower 100 shown in FIG. 1. While architecture 200 is described below in the context of a robotic mower, architecture 200 can be utilized with other types of autonomous machines as well. Examples include unmanned aerial vehicles (UAVs) or aerial drones, as well as marine or waterborne vessels. Further, a ground-based autonomous machine can perform other types of operations, such as forestry operations, construction operations, agricultural operations, to name a few.

As shown in FIG. 2, autonomous machine 202 (also referred to as robotic mower 202) includes a control system 204, a communication system 206, a sensor system 208, an imaging system 210, and one or more controllable systems 212. Robotic mower 202 also includes one or more user interfaces 214, one or more processors 216, and can include other items 218 as well.

Control system 204 is configured to control other components and systems of machine 202. For instance, control system 204 generates control signals to control communication system 206 to communicate with other systems in architecture 200. For instance, communication system 206 facilitates communications over a network 220, which can be a wide variety of different types of networks, such as the Internet, a cellular network, a local area network, a near field communication network, or any of a wide of other networks or combinations of networks or communication systems.

Communication system 206 can include wireless communication logic 222, which can be substantially any wireless communication system that can be used by the systems and components of machine 202 to communicate information to other items in architecture 200, such as computing system 224, or other computing systems such as remote system 226.

Remote system 226 can be a wide variety of different types of systems. For example, remote system 226 can be a remote server environment, remote computing system that may be used, for example, by a remote user, an administrative user, etc. Further, it can be a remote computing system, such as a mobile device, remote network, or a wide variety of other remote systems. The remote system can include one or more processors or servers, a data store, and it can include other items as well.

Wireless communication logic 222 can be configured to communicate directly with computing system 224, through any of a wide variety of different types of wireless communication protocols. Some examples include, but are not limited, Bluetooth, WiFi, and the like. In one example, communication system 206 communicates with computing system 224, or other items in architecture 200, using Message Queuing Telemetry Transport (MQTT) facilitated by MQTT component 228. Communication system 206 can include other items 230 as well.

Control system 204 generates control signals to control one or more of controllable subsystems 212. For example, control system 204 can control a propulsion system 232 to control the speed and steering of path robotic mower 202 as it traverses over a worksite. In the example of FIG. 1, this can include controlling motors to drive traction wheels to control the speed and direction of mower 202 using navigation components 234.

Navigation components 234 illustratively receive signals from position sensors 236 and orientation and relative movement sensors 238 of sensor system 208. The signals from position sensor(s) 236 indicate local or global coordinates. The signals from sensor(s) 238 indicate an orientation (e.g., pitch, yaw, roll, for instance). This can include the direction that machine 202 is facing, as well as the slope or angle or the terrain that machine 202 is on. Further, the signals can indicate the current speed, acceleration, etc. of machine 202.

Controllable system(s) 212 can also include a cutting system 240, and can include other items 242 as well. Cutting system 240 illustratively includes a motor configured to rotate cutting blades (e.g., blades 106) at a desired speed, which can be controlled by control system 204.

Position sensor(s) 236 can include one or more of a Global Navigation Satellite System (GNSS) receiver 244 that receives signals from a GNSS satellite transmitter. Sensor(s) 236 can also include a Real-Time Kinematic (RTK) component 246 that is configured to enhance the precision of position data derived from the GNSS signal from receiver 244. Illustratively, RTK component 246 uses measurements of the phase of the signal's carrier wave in addition to the information content of the signal to provide real-time corrections, which can provide up to centimeter-level accuracy of the position determination. Position sensor(s) 236 can include other items 248 as well.

Sensors 238 can include one or more accelerometers 250, and/or an inertial measurement unit (IMU) 252. For example, but not by limitation, IMU 252 can utilize accelerometer(s) and/or gyroscopes to measure and report specific forces, angular rates, etc. of robotic mower 202. Of course, sensor(s) 238 can include other items 254 as well. Sensor system 208 can include other types of sensors 209 as well.

Control system 204 can also control user interface(s) 214, which include user interface mechanism(s) 256. Mechanism(s) 256 can include input mechanisms configured to receive input from a user 258 and output mechanisms that render outputs to user 258. The user input mechanisms can include mechanisms such as hardware buttons, switches, joysticks, keyboards, etc., as well as virtual mechanisms or actuators, such as a virtual keyboard or actuators displayed on a touch sensitive screen. The output mechanisms can include display screens, speakers, etc.

Imaging system 210 includes image capture component(s) 211 configured to capture images and image processing component(s) 213 configured to process those images. Imaging system 210 can include other items 215 as well.

For sake of illustration, but not by limitation, computing system 224 comprises a mobile computing device (also referred to as mobile device 224), such as a mobile phone, tablet computer, etc. As noted above, mobile device 224 is configured to communicate with robotic mower 202 either directly, through network 220, or otherwise. Mobile device 224 includes a communication system 260 that includes wireless communication logic, such as that described above with respect to communication system 206. Illustratively, communication system 260 includes a corresponding MQTT component 262 configured to communicate with MQTT component 228 of communications system 206. Communication system 260 can include other items 264 as well.

Mobile device 224 includes an imaging system 266, a sensor system 268, user interface logic 270, one or more processors 272, and can include other items 274 as well.

Mobile device 224 is also illustrated as including a display device 275 (such as a touch sensitive display screen), an application component 277 and a data store 279. Data store 279 can store boundary maps 281, applications 283 to be run by application component 277, and can store other items as well.

User interface logic 270 is configured to generate user interface(s) 276 for user 258. User interface(s) 276 includes user interface mechanisms 278, such as those discussed above with respect to mechanism(s) 256. Through user interface(s) 276, user 258 can interact with and control mobile device 224.

In one example, image capture component(s) include a stereo camera configured to capture video of the worksite being operated upon by machine 202. An example stereo camera captures high definition video at thirty frames per second (FPS) with one hundred ten degree wide-angle field of view. Of course, this is for sake of example only. In another example, image capture component(s) 211 can capture still images that are compiled into a time-series of images, which represents a video sequence from the images. In one example, image capture components can include multi-spectral or hyper-spectral cameras. In any case, image capture component(s) 211 is configured to capture images of the worksite for processing by image processing component(s) 211.

Image processing component(s) 213 includes visual odometry logic 217, which is discussed in further detail below. Briefly, however, visual odometry logic 217 is configured to determine the position and orientation of robotic mower 202 by analyzing the images captured by image capture component(s) 211. Using visual odometry logic 217, navigation component(s) 234 can determine the position of robotic mower 202, from images captured in real-time, for use in controlling machine 202 to traverse the worksite.

Imaging system 266 includes image capture component(s) 267, image processing component(s) 269, and can include other items 271 as well. In one example, image capture component(s) 267 include one or more components discussed above with respect to components 211. Similarly, image processing component(s) 268 can include one or more items discussed above with respect to component(s) 213. For example, component(s) 268 can include visual odometry logic 273.

Sensor system 268 includes position sensor(s) 280 and orientation and relative movement sensors 282. Sensor system 268 can include other items 284 as well. Illustratively, position sensor(s) 280 includes a GNSS receiver 286, an RTK component 288, and can include other items 290 as well. In one example, these items are similar to those discussed above with respect to position sensors 236. Sensor(s) 282 can include accelerometer(s) 292, an IMU 292, and can include other items 296 as well. In one example, these items are similar to those discussed above with respect to sensor(s) 238.

Architecture 200 also includes a boundary detection system 298. System 298 is configured to detect a boundary for an operating area of robotic mower 202 based on images captured by robotic mower 202 and/or mobile device 224. An example of boundary detection system 298 is discussed below. Briefly, however, boundary detection system 298 is configured to capture or otherwise receive one or more images of the worksite, such as still image(s), a video feed, and/or a plurality of images compiled together into a time series. Navigation component 234 receives an indication of the boundary and operates to autonomously control robotic mower 202 to perform a mowing operating with an operational area defined by the boundary. This can be done in any of a number of ways. In one example, navigation component 234 calculates an optimal or desired path (e.g., shortest path in terms of time, distance, etc.) to cover the entire operating area within the defined boundary.

It is noted that while boundary detection system 298 is illustrated as a separate block, separate from both robotic mower 202 and mobile device 224, this is for sake of illustration only. Some or all components of boundary detection system 298 can be disposed on robotic mower 202. This is represented by block 298-1. Alternatively, or in addition, one or more components of boundary detection system 298 can be disposed on mobile device 224. This is represented by block 298-2. Alternatively, or in addition, one or more components of boundary detection system 298 can be disposed on remote system 226. This is represented by block 298-3.

Figure 3:
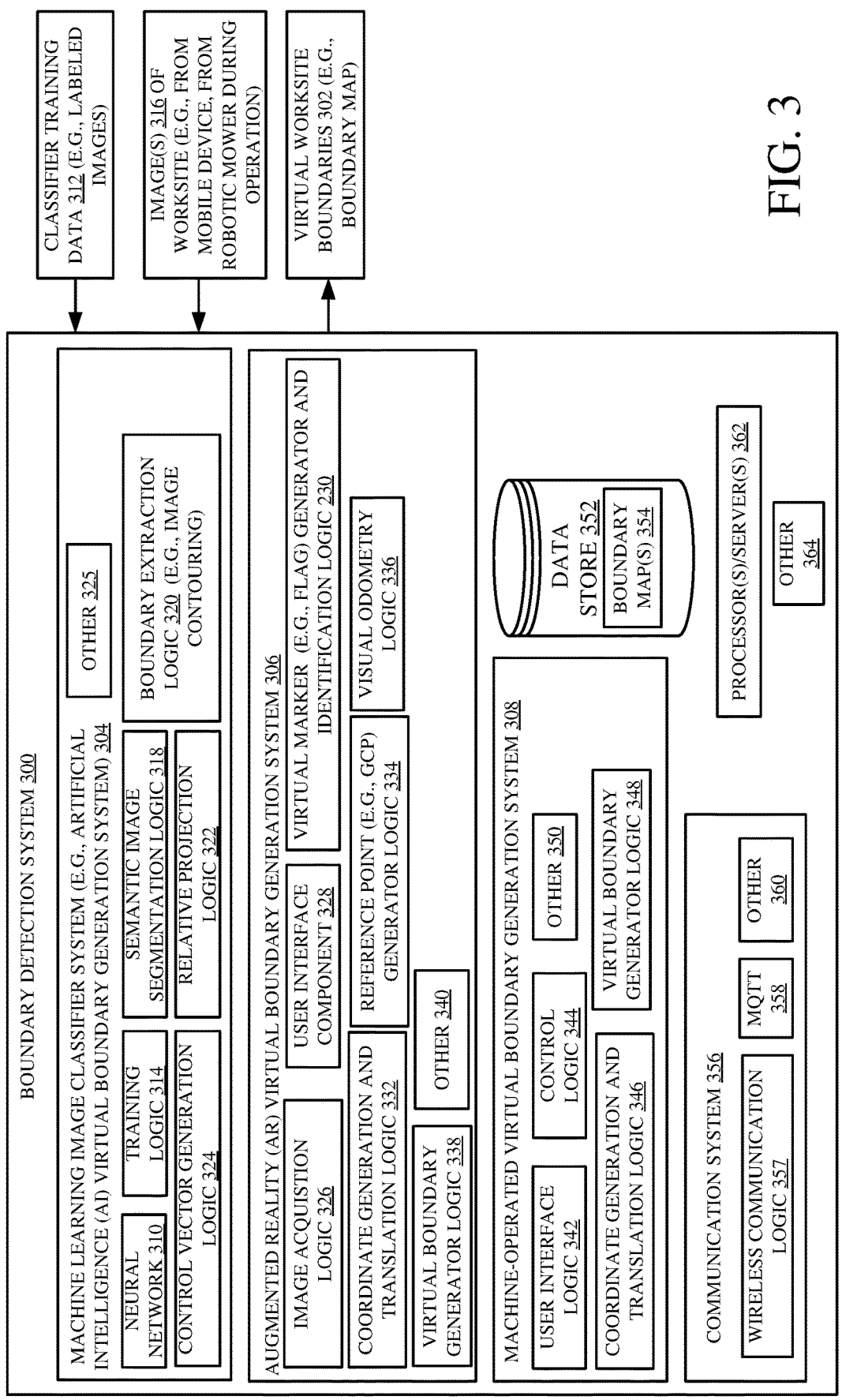
FIG. 3 is a block diagram showing one example of the boundary detection system shown in FIG. 2.

FIG. 3 illustrates one example of a boundary detection system 300, such as boundary detection system 298 shown in FIG. 2. System 300 includes one or more virtual boundary generation systems that are configured to generate and output indications of virtual worksite boundaries 302, such as a boundary map that is used to control robotic mower 202. An example of a virtual worksite boundary comprises a virtual line or series of discreet points that represent a line around (or partially around) a desired operating area of the worksite. For example, the virtual boundary surrounds a residential yard to be mowed by robotic mower 202.

In the example of FIG. 3, boundary detection system 300 includes one or more of a machine learning classifier system 304, an augmented reality (AR) virtual boundary generation system 306, and/or a machine-operated virtual boundary generation system 308. Before discussing operation of boundary detection system 300 in further detail, an overview of components of system 300 will be discussed.

System 304 illustratively utilizes artificial intelligence (AI) to identify the virtual worksite boundaries 302. In the example of FIG. 3, system 304 comprises a learning mechanism, such as a neural network 310, that is trained with training data 312. An example of training and use of system 304 is discussed below with respect to FIG. 15. Briefly, however, neural network 310 can comprise a deep neural network (DNN), such as a convolutional neural network (CNN). Of course, other types of classification or learning mechanisms, such as rule-based classifiers, decision trees, etc. can be utilized.

Training logic 314 receives training data 312 to train neural network 310. Training data 312 illustratively comprises labeled images of a target terrain type. An image can be labeled with polygon(s) representing regions in the image that contain the target terrain type and/or non-target terrain types. In the case of a robotic mower cutting residential or commercial lawns, the images can be labeled to indicate regions that have grass and/or regions that are non-grass (e.g., landscaping, sidewalks, driveways, etc.). Using this labeled training data, training logic 314 trains neural network 310.

Images 316 of the worksite can be received from image system 210 and/or imaging system 266. For example, images 316 of the worksite can be received prior to operation of robotic mower 202, and used to create virtual boundaries 302. Alternatively, or in addition, images 316 can be processed using trained neural network 310 to generate virtual worksite boundaries 302. For instance, during operation of robotic mower 202 on the worksite, images 316 of the worksite can be received and processed in real-time or substantially real-time to determine boundaries 302.

A semantic image segmentation logic 318 is configured to perform semantic image segmentation of an image which analyses the image to associate pixels or groups of pixels of the image with a class label. In the present example, this classifies a pixel or group of pixels as representing grass or non-grass. Semantic image segmentation logic 318 illustratively outputs a resulting semantic image segmentation lawn mask that represents areas of the images that represent lawn or grass.

Boundary extraction logic 320 processes the resulting lawn mask from logic 318, for example to erode, blur, and dilate the mask to smooth edges of the grass/non-grass areas of the mask. Contouring selects the largest area contour as the likely lawn or grass area, and can clip the left, right, or bottom area of the mask to account for (e.g., omit) edge artifacts in the the subsequent control.

Relative projection logic 322 uses a perspective transform from calibration data to transform the border of the image into a view relative to the camera. Control vector generation logic 324 then generates a control or boundary vector based on the extracted boundary. System 304 can include other items 325 as well.

An example operation of AR virtual boundary generation system 306 is discussed below with respect to FIG. 5. Briefly, however, system 306 performs image-based AR boundary generation using mobile device 224. System 306 includes image acquisition logic 326 configured to acquire images of the worksite (e.g., images 316 captured by image captured component(s) 267 of mobile device 224). This can include a still image, a series of still images, a video feed, etc. The images can be displayed to the user on a display device, such as display device 275 of mobile device 224, using user interface component 328. Based on user input detected by user interface component 328, virtual marker (e.g., flag) generator and identification logic 330 is configured to generate virtual markers corresponding to positions in the acquired images. Coordinate generation and translation logic 332 is configured to generate coordinates for the virtual markers and/or translate the coordinates between different coordinate systems. For example, coordinates can be translated between local coordinates in a local coordinate system and global coordinates in a global coordinate system (e.g., World Geodetic System (WGS), etc.) using reference points generated by reference point generator logic 334. One example of logic 334 uses ground control points to correlate local coordinates of the virtual markers to the global coordinates. Ground control points illustratively have known locations, defined with very high accuracy, on or around the worksite.

The reference points can be generated in any of a variety of ways. For instance, they can be done by sending a human being with a survey-grade global navigation satellite system (GNSS) receiver to the location of the reference point (e.g., ground control point) to be established. The human then stands at that location for several minutes so that the GNSS receiver can collect the data used for a precise localization of that spot. This coordinate data is then stored for the reference point, and later used by logic 332 for translation of local coordinates into global coordinates.

Visual odometry logic 336 is configured to perform visual odometry. Examples of visual odometry are discussed above. System 306 can include other items 340 as well.

Virtual boundary generator logic 338 is configured to generate a representation of a virtual boundary based on the coordinates of the virtual markers.

An example of machine-operated virtual boundary generation system 308 is discussed below with respect to FIG. 13. Briefly, however, system 308 is configured to generate virtual worksite boundaries 302 though operation of the robotic mower 202 itself. For example, a user can operate the robotic mower 202 to drive along the desired boundary and acquire coordinates that are then used to generate a boundary map.

System 308 includes user interface logic 342, configured to generate user interface displays or other mechanisms, control logic 344 configured to control robotic mower 202, coordinate generation and translation logic 346, virtual boundary generator logic 348, and can include other items 350 as well. In one example, logic 346 and 348 are similar to logic 332 and 338, discussed above.

The virtual worksite boundaries generated by any of systems 304, 306, 308 can be stored in a data store 352, for example as boundary maps 354.

System 300 is also illustrated as including a communication system 356 that is similar to communication systems 206 and 260 discussed above. For instance, system 356 can include wireless communication logic 357, MQTT logic 358, and/or can include other items 360 as well.

System 300 is also illustrated as including one or more processors or servers 362, and can include other items 364 as well.

Figure 4:
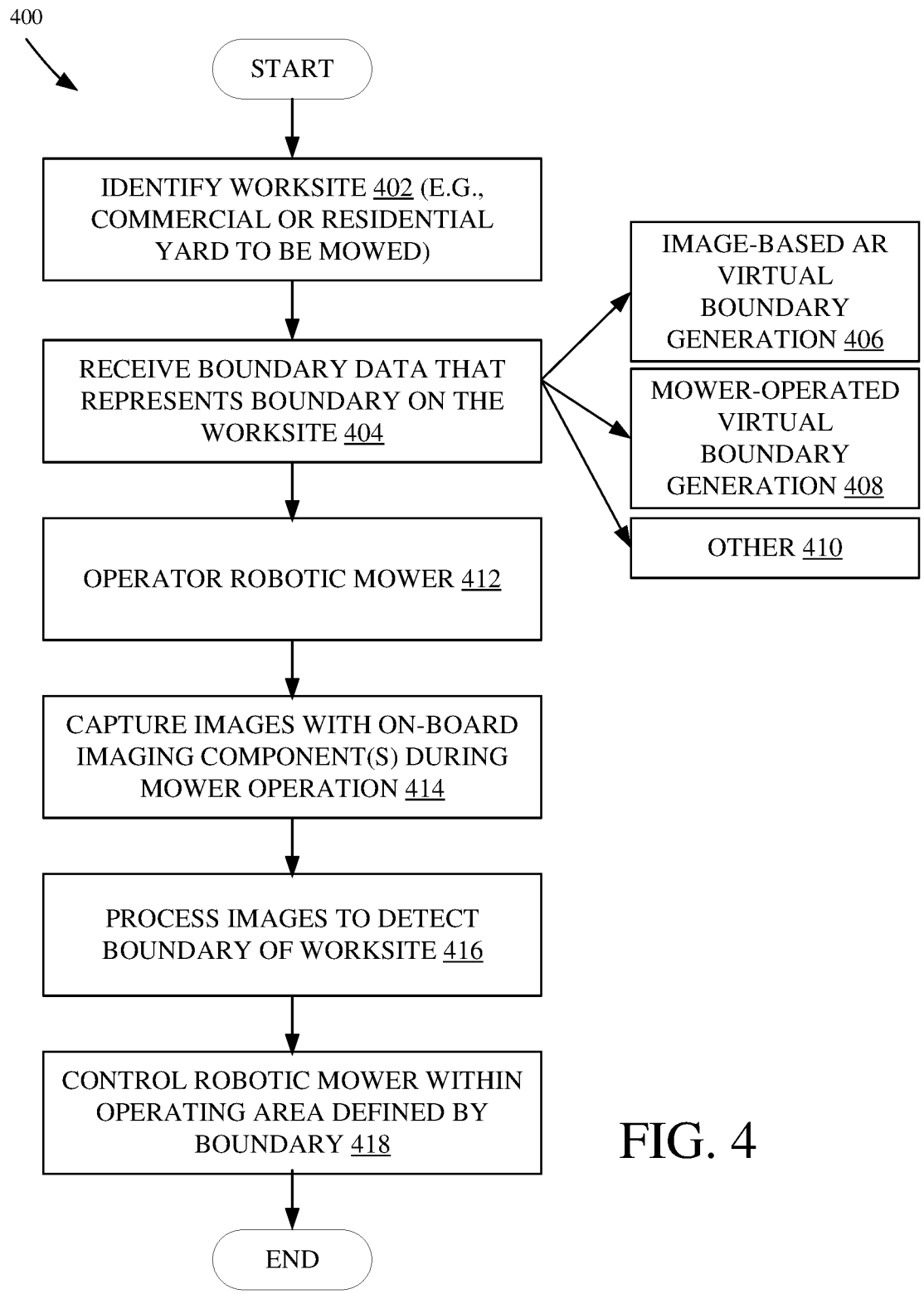
FIG. 4 is a flow diagram illustrating an example method of operation of a boundary detection system.

FIG. 4 is a flow diagram illustrating an example method 400 of operation of a boundary detection system. Method 400 will be described in the context of system 300 in architecture 200, for sake of illustration but not by limitation.

At block 402, a target worksite is identified. This can include a commercial or residential yard to be mowed. Boundary data that represents a boundary on the worksite is received at block 404. This can include boundary data from image-based augmented reality (AR) virtual boundary generation using system 306. This is represented by block 406. Alternatively, or in addition, the received boundary data can be based on mower-operated virtual boundary generation using system 308. This is represented by block 408. The boundary data can be generated and received in other ways as well. This is represented by block 410.

At block 412, the mower is operated on the worksite. Illustratively, control system 204 controls propulsion system 232 to navigate around the worksite within an operating area defined by the boundary data received at block 404. Navigation component 234 receives position data from position sensor(s) 236 to identify a current location of robotic mower 202, relative to a boundary.

At block 414, images are captured in real-time with on-board imaging components during operation of robotic mower 202. For example, a stereo camera or other image capture components capture images of an area of the worksite in front of robotic mower 202 in the direction of travel. These images are processed at block 416 to detect a boundary for the robotic mower 202. For example, using neural network 310, machine learning image classifier system 304 can detect a boundary for a robotic mower 202 dynamically, in real-time, as the robotic mower 202 is traversing across the worksite. At block 418, the robotic motor is controlled within the operating area defined by the boundary.

Figure 5A:
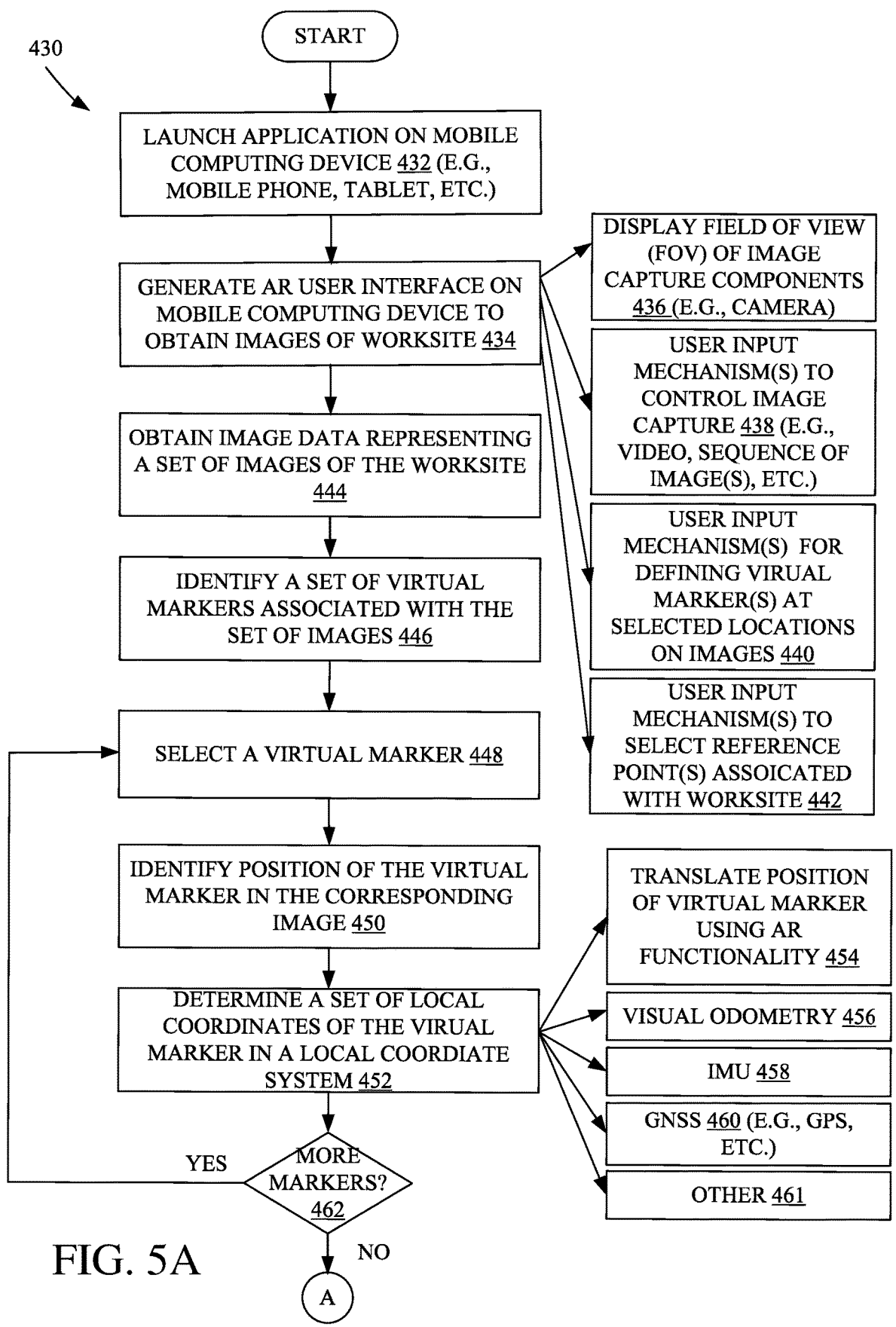
FIGS. 5A and 5B (collectively referred to as FIG. 5) is a flow diagram illustrating one example of a method for image-based AR virtual boundary generation.
Figure 5B:
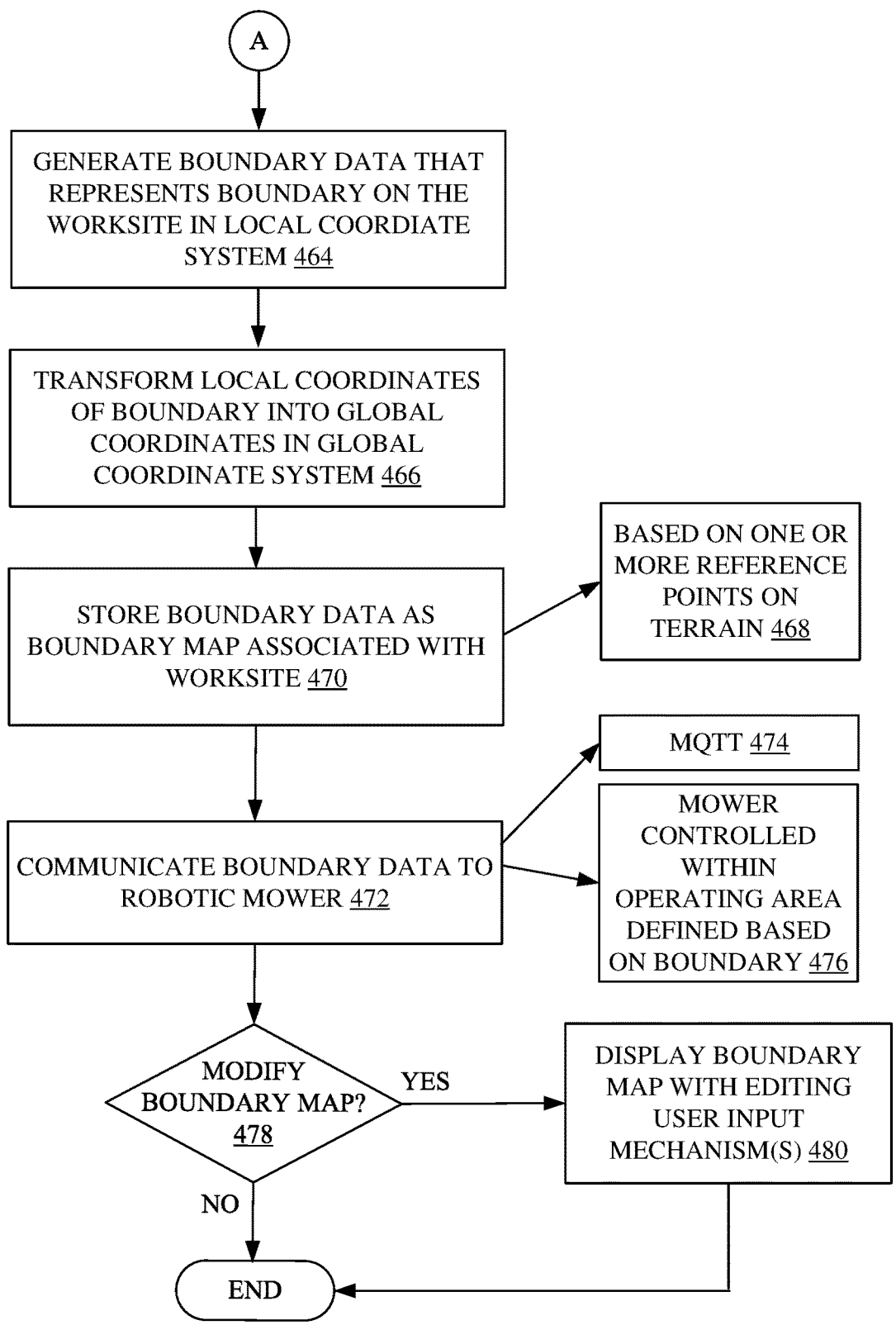

FIG. 5 is a flow diagram illustrating one example of a method 430 for image-based AR virtual boundary generation. For sake of illustration, but not by limitation, method 430 will be described in the context of system 206 in architecture 200.

At block 432, an application (e.g., application 283) is launched on mobile device 224. At block 434, the launched application generates a user interface on mobile device 224 to obtain images of a worksite for which a boundary map is to be generated.

In one example, the application utilizes augmented reality to integrate virtual content with images of the real world as seen through the camera (or other image capture component) of the mobile device 224. The AR provides motion tracking to understand the position and orientation of the camera relative to the worksite, and to detect the size and location of various types of surfaces, such as horizontal, vertical, and angled surfaces of the ground, walls, landscape, or other objects around the worksite. Through the AR interface, a user is able to generate and place virtual markers (e.g., virtual flags) on images of the worksite that represent the desired boundary for robotic mower 202. Using visual odometry and/or other sensors, mobile device 224 can determine its location and orientation, and thus the position and orientation of the field of view of the camera. Examples of augmented reality interfaces include, but are not limited to, ARKit by Apple, ARCore by Google, to name a few.

The user interface displays a field of view (FOV) of the camera. This is represented by block 436. At block 438, a user input mechanism is generated to control the image capture. For instance, mechanisms for starting, pausing, and stopping the recording of video are provided in the interface. This is represented by block 438. At block 440, user input mechanism(s) for defining a set of virtual markers at selected locations on the images are provided for user actuation. These mechanisms allow the user to place virtual markers at desired locations on the images that correspond to the desired worksite boundary.

At block 442, user input mechanism(s) to select reference points associated with the worksite are provided. As noted above, a reference point can comprise a ground control point having a pre-established, high precision, geographic coordinates in a global coordinate (or other) system associated with that point. The reference points allow the system to translate local coordinates of the virtual markers to the global coordinates in a global coordinate system.

At block 444, image acquisition logic 326 acquires the images captured by the camera of mobile device 224 and, at block 446, the method identifies a set of virtual markers associated with the set of images that were generated based on user actuation of the input mechanisms generated at block 440.

For a selected one of the virtual markers (block 448), the method identifies a position of that virtual marker in the corresponding image at block 450. Based on this position within the corresponding image, the method determines a set of local coordinates of the virtual marker in a local coordinate system. This is represented by block 452.

This can be done in any of a number of ways. For example, at block 454, the application translates the position of the virtual marker using the AR functionality of the application. This can include one or more of using visual odometry at block 456, signals from an IMU at block 458, and/or signals from a GNSS receiver at block 460. The coordinates can be identified in other ways as well. This is represented by block 461.

The AR functionality of the application, in one example, uses concurrent odometry and mapping (referred to as "COM") to understand where the phone is relative to the world around it. The application detects features in the captured image, referred to as feature points, and uses these points to commute its change in location. The visual information can be combined with inertial measurements from the device's IMU to estimate the pose (position and orientation) of the camera relative to the terrain over time. Thus, the application translates the position of the virtual marker in the image into a set of coordinates in a given coordinate system. This is repeated for each marker in the set of markers, as represented at block 462.

The boundary data that represents the boundary can be generated in a local coordinate system. This is represented by block 464. At block 466, the local coordinates of the boundary are transformed into global coordinates in a global coordinate system. In one example, this is based on one or more reference points, such as ground control points with high-precision geographic coordinates, that are identified on the worksite. This is represented by block 468. The reference points can be identified based on user input through the application on mobile device 224, and can be identified in other ways as well.

In one example, at least two initial reference points are identified with GPS-RTK data, which is then meshed with local coordinates determined from the virtual markers. A GPS-RTK point utilizes Real-Time Kinematics (RTK) to enhance GPS data. By using two initial reference points, the boundary map of the local coordinates can be rotated and aligned to the global coordinates of the reference points, to tie the boundary map to the global coordinate system. In one example, the latitude and longitudinal coordinates of the boundary map are used to impose the boundary map over a satellite image of the worksite.

At block 470, the boundary data is stored as a boundary map associated with worksite. At block 472, the boundary data is communicated to robotic mower 202 through any suitable communication channel. For example, the boundary data (e.g., boundary map) is sent by communication system 356 to communication system 206, using corresponding MQTT logic 358 and 228. This is represented by block 474. At block 476, control system 204 controls operation of robotic mower 202 within an operating area defined based on the boundary data.

At block 478, the boundary map can be modified by the user, if desired. For instance, the boundary map can be displayed on display device 275 with modification user input mechanisms that are actuatable to modify the boundary. This is represented by block 480. For instance, the user can add, move, or delete the virtual markers. Further, the user can manually draw or move the boundary map. This allows the user to modify the boundary map, for example if the worksite changes (e.g., a new tree or landscaping is added to the yard, etc.). In this manner, the boundary map can be recalled from storage, modified, and resaved for subsequent use.

Figure 6:
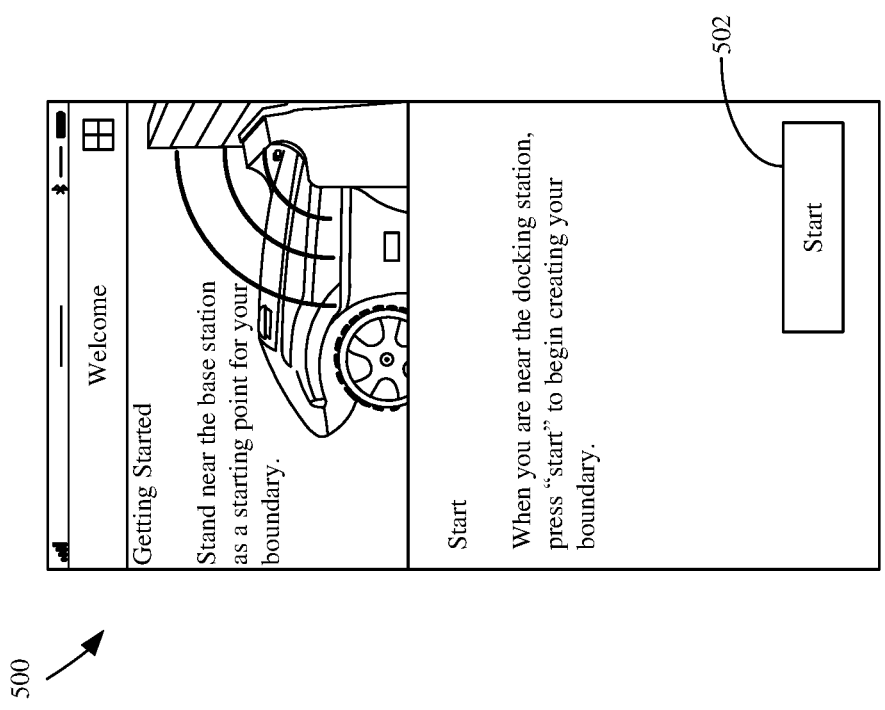

FIGS. 6-9 illustrate example user interface displays generated by the application launched at block 432. Display 500 shown in FIG. 6 provides an initial start screen where the user can begin the process of virtually marking a boundary for a worksite. Illustratively, the user begins at the docking station for the robotic mower, which has been identified as a reference point, and actuates a start user input mechanism 502. This start point correlated to the reference point, such as by placing a first virtual marker at the reference point.

Figure 7:
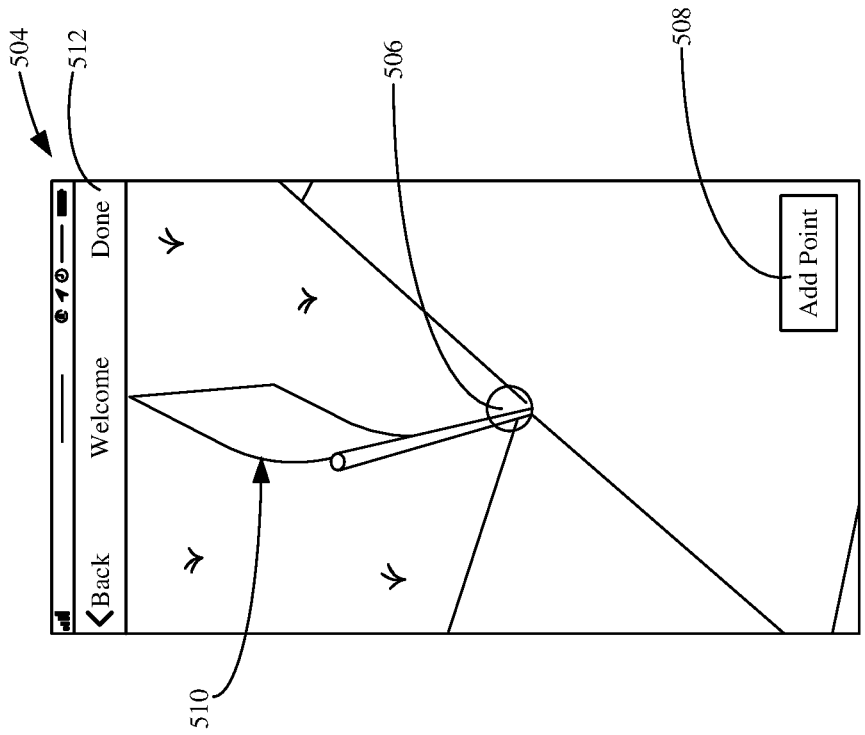
FIGS. 6-9 illustrate example user interface displays for image-based AR virtual boundary generation.
Figure 8:
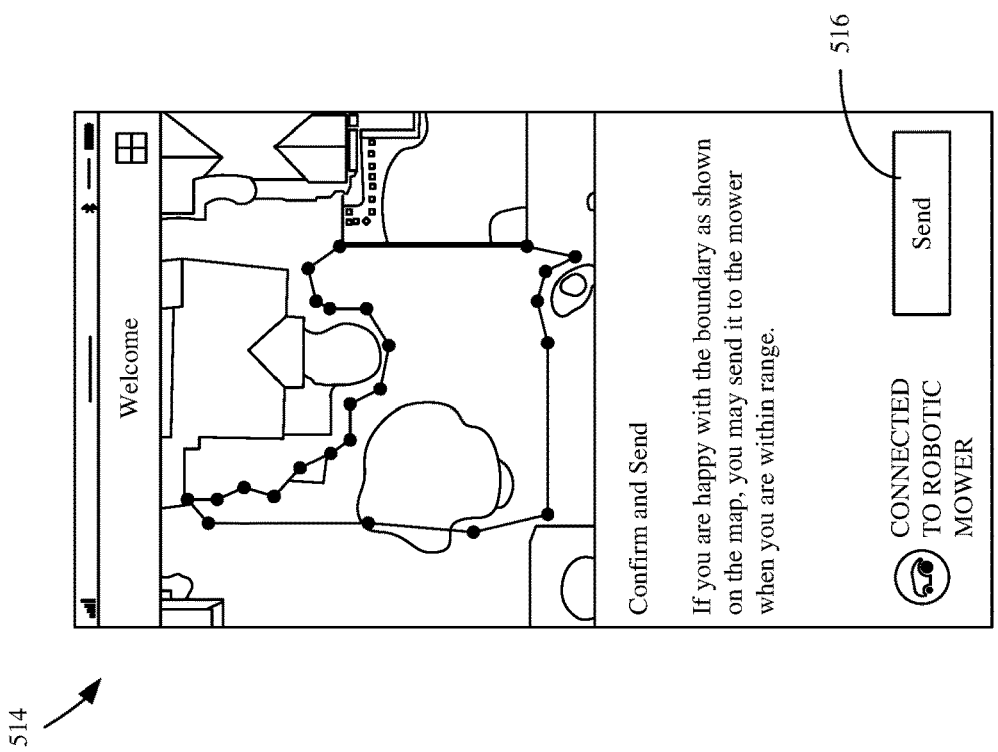

As shown in FIG. 7, a user interface 504 displays the FOV of the camera of the mobile device as the user walks about the worksite. When a cursor 506 on the display is aligned with a desired location on the worksite, the user actuates an add button 508 to place a virtual marker 510 at that location. The user traverses the desired boundary, placing a number of virtual markers. Once all desired virtual markers have been placed, the user actuates button 512 to complete the process. Then, user interface display 514 shown in FIG. 8 is displayed with a send actuator 516, that is actuatable to send the boundary data to robotic mower 202. In one example, display 514 can include editing actuators that allow the user to edit the boundary shown on the display, for example by adding virtual markers, moving virtual markers, deleting virtual markers, etc.

Figure 9:
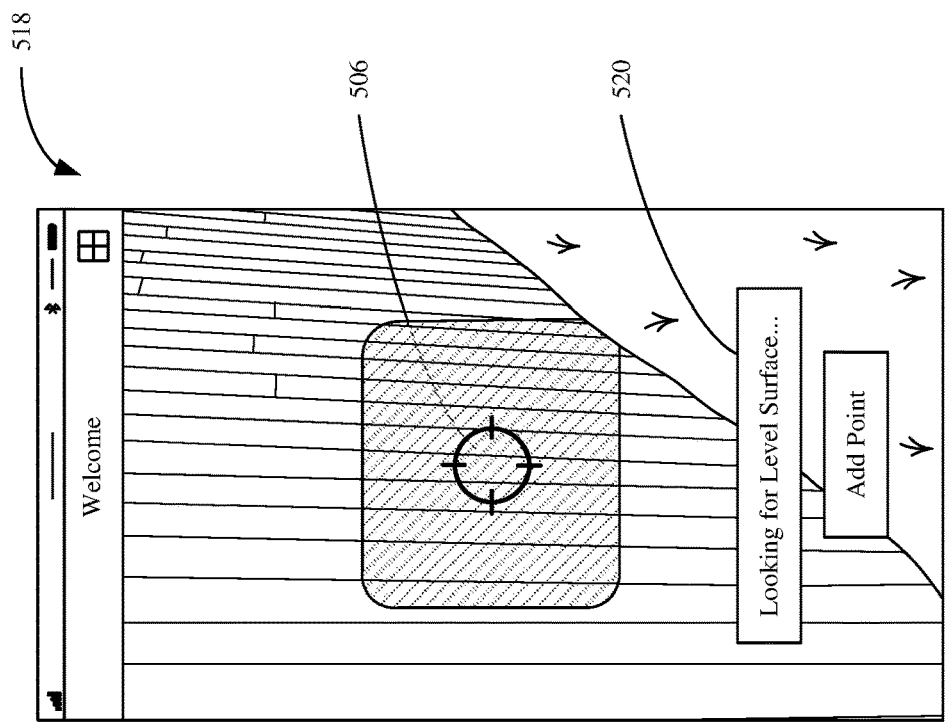

In accordance with one example, the application can compute confidence metrics that represent a placement confidence of the location identified by the cursor 506. That is, if the application determines that the identified location is not sufficient to allow the user to place a virtual marker, the application can display an indication of this. As shown in the example of FIG. 9, the application displays an indicator 520 that indicates that a virtual marker cannot be placed at the current location. For example, if the application determines that the identified area of the train cannot be traversed by the robotic mower (e.g., it is not ground level or has a high slope etc.), the system indicates this and requires that the user move the cursor before placing the next virtual marker.

Figure 10:
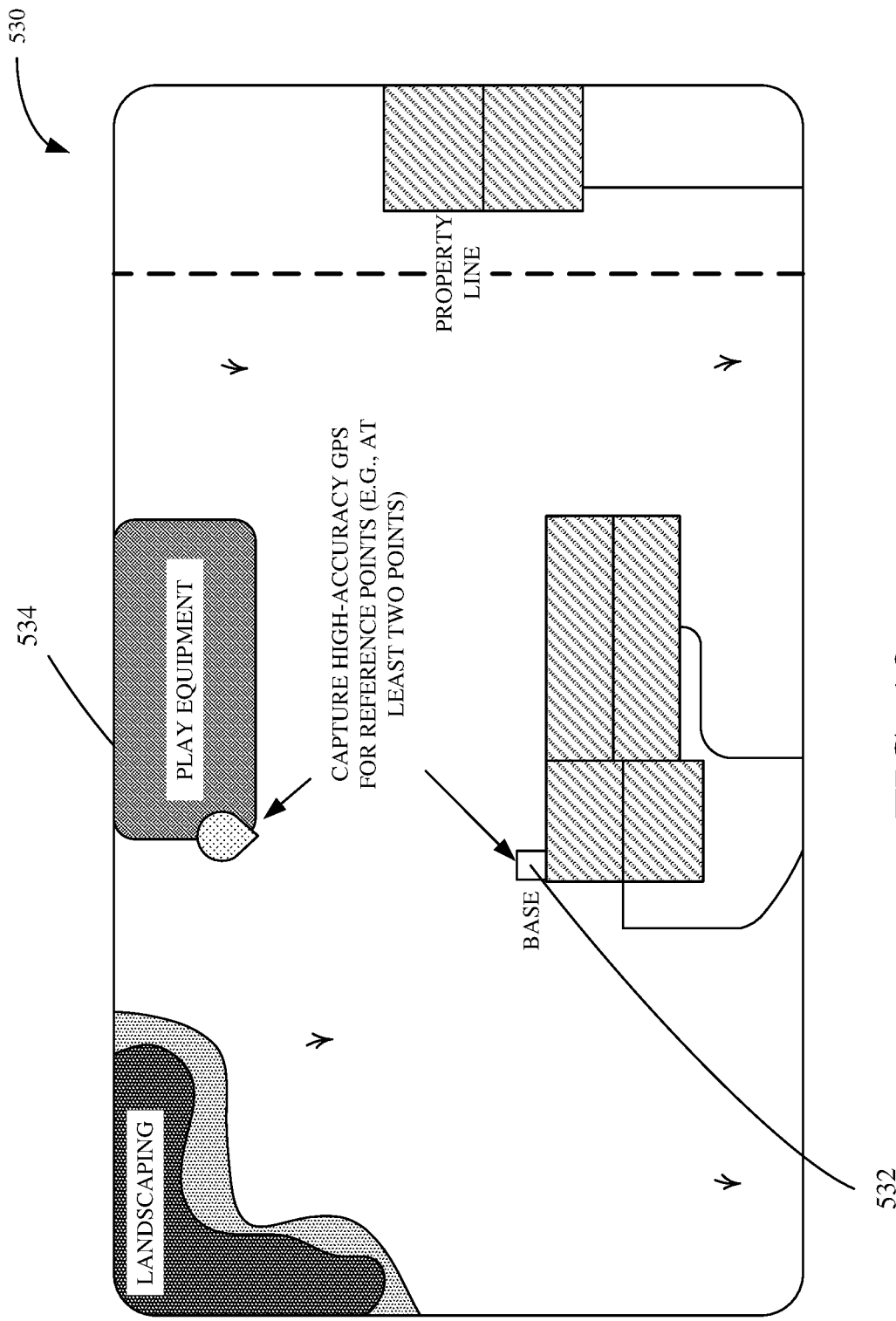
FIGS. 10-12 provide a schematic illustration of a process for placing a set of virtual markers that define a boundary for a robotic mower.
Figure 11:
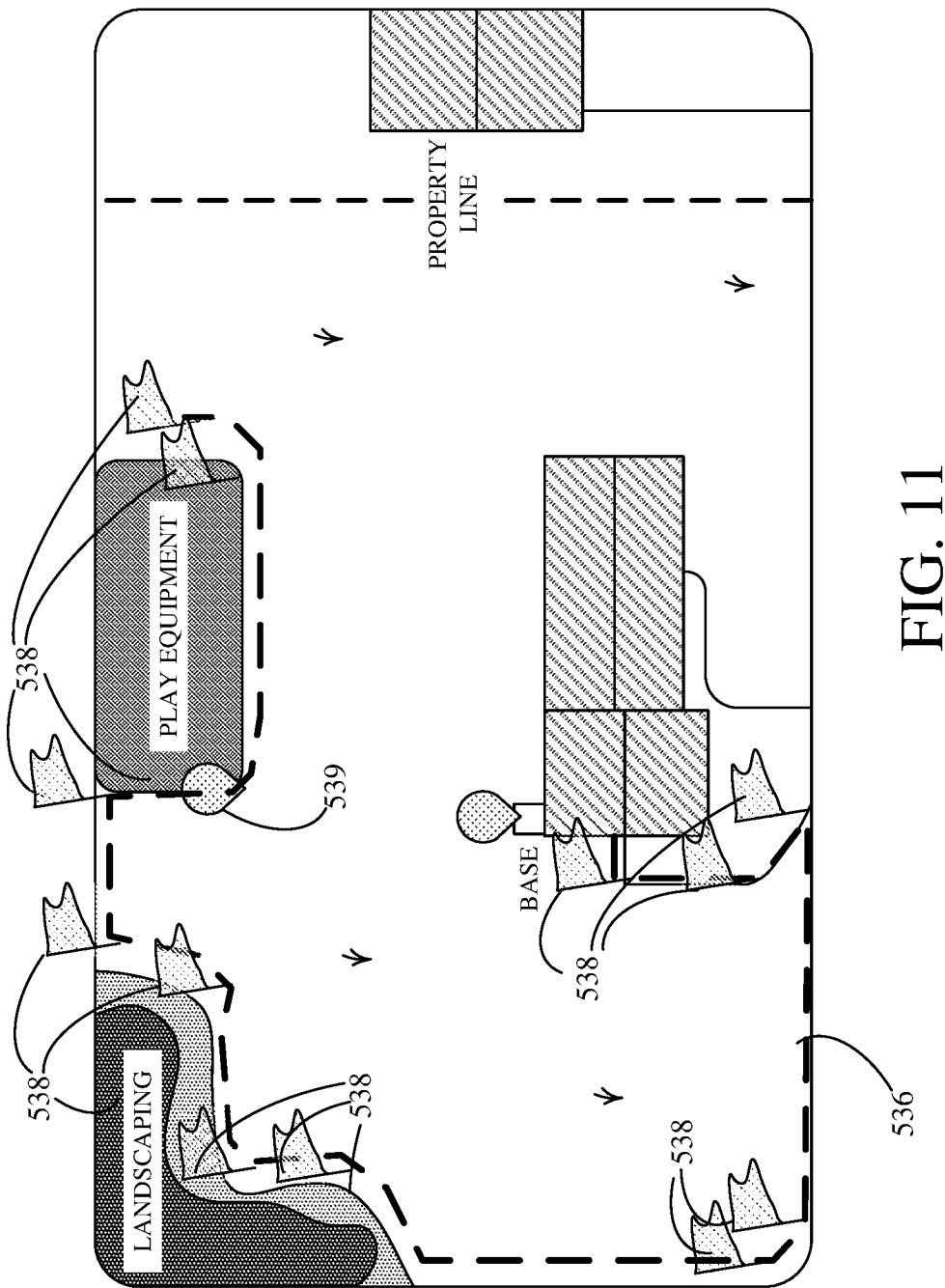
Figure 12:
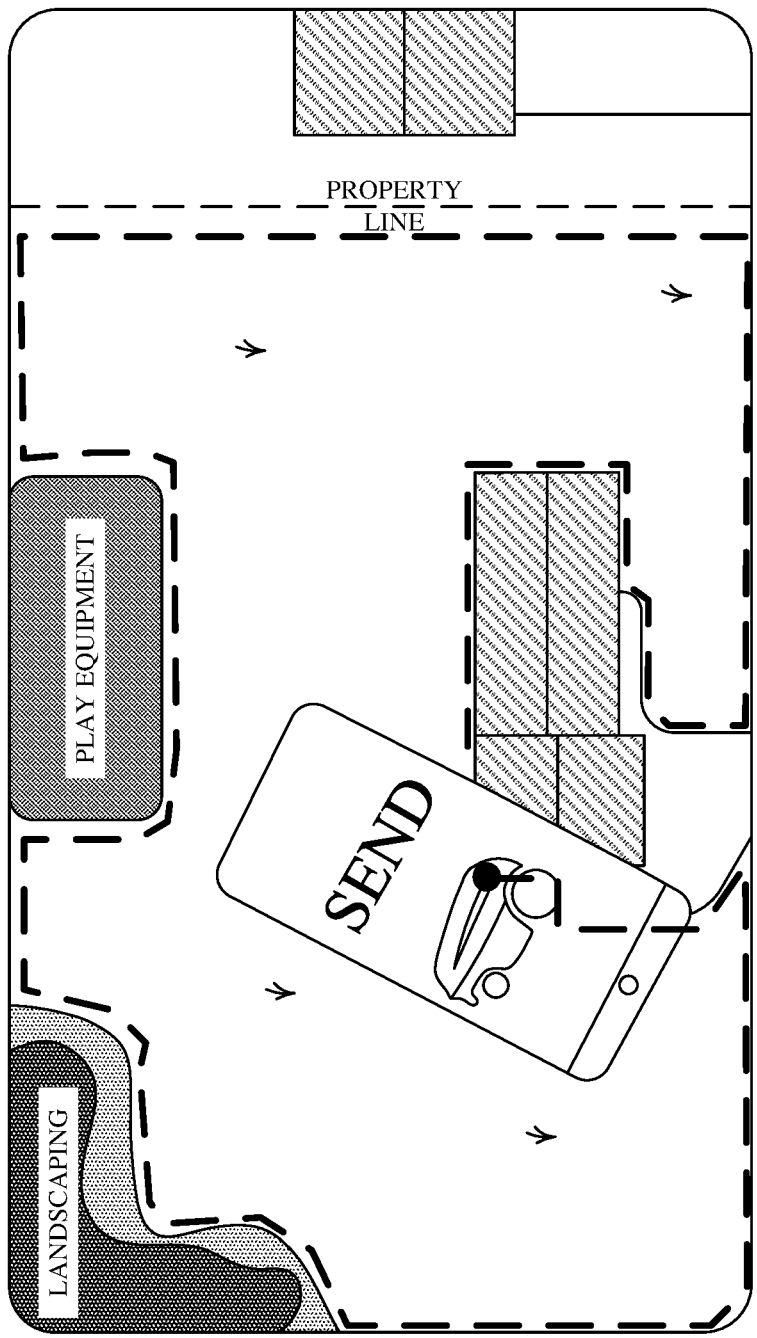

FIGS. 10-12 provide a schematic illustration of a process for placing a set of virtual markers that define a boundary that is sent to a robotic mower. As shown in FIG. 10, a worksite 530 has a base or docking station 532 for the robotic mower. In this example, GPS-RTK data has been identified for this location, such that the system has high precision data for this point. The base station 532 is used as a first reference point that is correlated to the virtual marker(s)/boundary. GPS-RTK data is also identified for at least one other reference point 534. This can be done in any of a number of ways, some of which are discussed above. The user begins traversing a path represented by dashed line 536 in FIG. 11, and places a number of virtual markers on captured images that correspond to locations on the worksite. These virtual markers are represented in FIG. 11 as flags 538. At reference numeral 539, the user places or otherwise correlates a virtual marker with reference point 534. Once the user has placed all desired virtual markers. The boundaries identified as shown in FIG. 5G and is sent to the robotic mower for subsequent navigation control.

Figure 13:
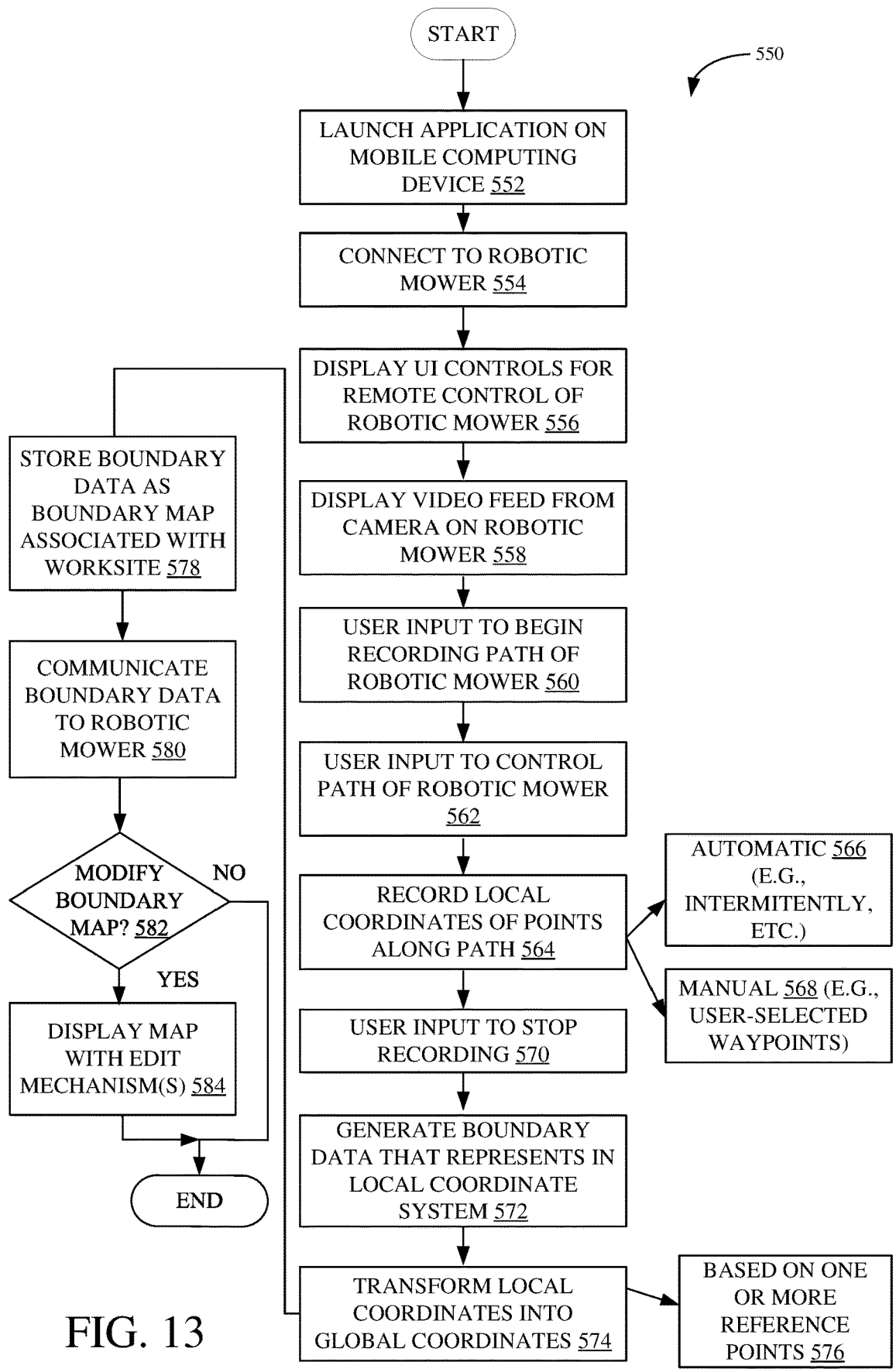
FIG. 13 is a flow diagram illustrating an example method performed by a machine-operated virtual boundary generation system.

FIG. 13 is a flow diagram illustrating an example method 550 performed by a machine-operated virtual boundary generation system (e.g., system 308). Method 550 allows a user to generate a virtual boundary through manual operation of the robotic mower. For sake of illustration, but not by limitation, method 550 will be described in the context of architecture 200.

At block 552, an application is launched on mobile device 224 (e.g., application component 277 runs application 283). At block 554, mobile device 224 connects to robotic mower 202 using communication systems 206 and 260. Application component 277 generates a user interface (user interfaces 276) on display devices 275 with user interface controls for remote control of robotic mower 202. This is represented by block 556. The user interface controls allow the user to control the mower via teleoperation (or other remote operation) to drive the mower around the boundary.

At block 558, images (such as a sequence of still images, a video feed, etc.) from the camera or other image capture components 211 of robotic mower 202 are displayed on mobile device 224. A user input is received at block 560 to begin recording of the path of the robotic mower. At block 562, user input is received, through the control user input mechanisms displayed at block 556, to control the path of robotic mower 202. As robotic mower 202 traverses the worksite, coordinates of a number of points along the path are recorded. This is represented by block 564.

In one example, the coordinates comprise local coordinates, in a local coordinate system that are automatically recorded, such as intermittently and/or based on recording criteria. This is represented at block 566. Alternatively, or in addition, the coordinates of the points along the path can be recorded manually, such as through user selected waypoints. This is represented by block 568.

At block 570, a user input to stop the recording is received. At block 572, boundary data is generated that represents the boundary in the given coordinate system (illustratively a local coordinate system).

At block 574, the local coordinates are transformed into global coordinates, for example based on one or more reference points. This is represented by block 576. One example of transforming local coordinates into global coordinates based on reference points, is discussed above with respect to blocks 466 and 468.

At block 578, the boundary data is stored as a boundary map associated with the worksite. The boundary data is communicated to the robotic mower at block 580. The boundary map can be modified (represented by block 582), for example by displaying a map with edit mechanisms as represented by block 584. One example of blocks 578-584 are illustrated above with respect to blocks 47-380 shown in FIG. 5.

Figure 14:
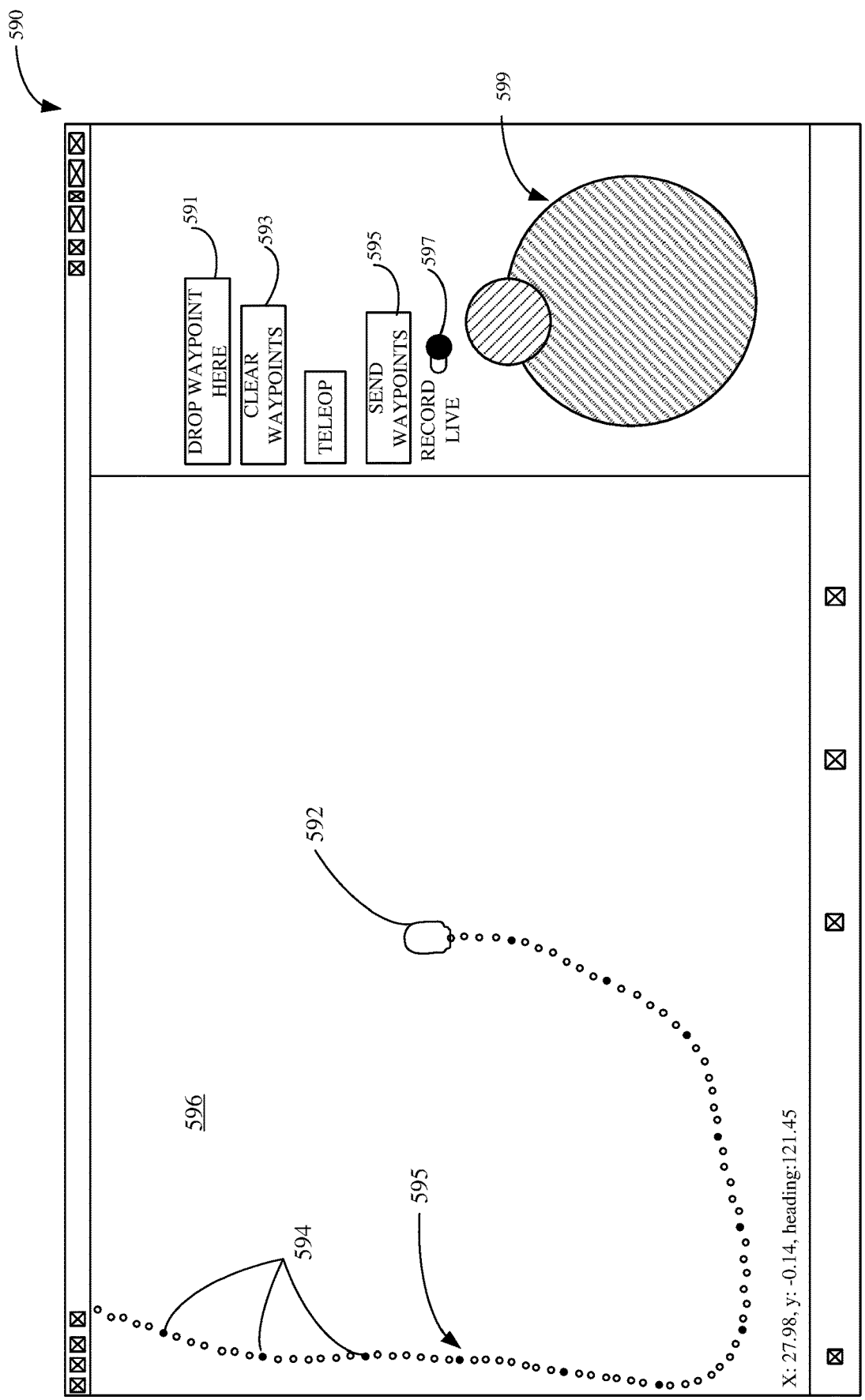
FIG. 14 illustrates an example user interface display for machine-operated virtual boundary generation.

FIG. 14 illustrates an example user interface display 590 displayed by method 550. Display 590 includes an icon 592 representing the current position of robotic mower 202 and the boundary points 594 being recorded while the user is navigating the robotic mower 202 across a path 595 on worksite 596. Display 590 includes a user input mechanism 591 for adding waypoints to the boundary map, a user interface mechanism 593 for clearing one or more of the waypoints, and a user input mechanism 595 for sending the boundary points to robotic mower 202. A user input mechanism 597 allows the user to selectively start and stop the recording and a user input mechanism 599 for controlling robotic mower 202 as it traverses across the worksite.

Figure 15:
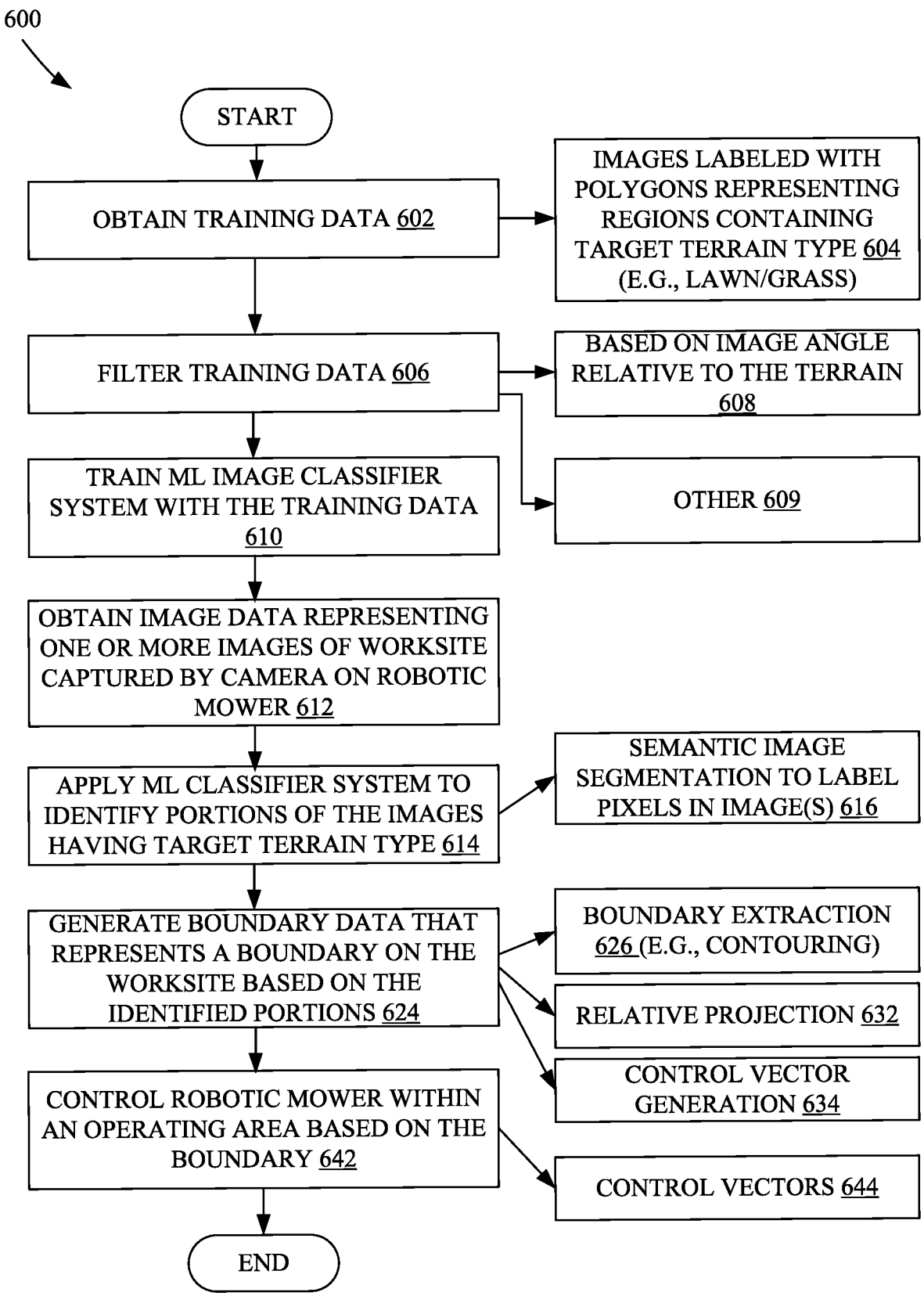
FIG. 15 is a flow diagram illustrating an example method for training and using a machine-learning image classifier system.

FIG. 15 is a flow diagram illustrating an example method 600 for training and using a machine-learning (ML) image classifier system. For sake of illustration, but not by limitation, method 600 will be described in the context of system 304 in architecture 200.

At block 602, training data is obtained by training logic 314. In one example, this includes images labeled with polygons representing regions containing a target terrain type (e.g., lawn or grass). This is represented by block 604. The labeled training data can be obtained from any of a variety of sources such as, but not limited to, remote system 226.

At block 606, the training data can be filtered based on filter criterion. In one example, the training data is filtered based on the image angle relative to the terrain. This is represented by block 608. For example, only labeled images that have an angle of approximately 25°, or less, relative to the terrain are utilized. Thus, any image obtained at a higher angle are omitted from the training set. This results in a training set of images having a perspective that will be similar to the angle that images are captured by the camera of robotic mower 202. Of course, the training data can be filtered in other ways as well. This is represented by block 609.

At block 610, the machine learning image classifier system is trained using the training data. For example, neural network 310 is trained using the filtered set of labeled training images.

At block 612, image data representing one or more images of the worksite are obtained. These images are captured in real-time by the component 211, on robotic mower 202 during the mowing operation.

The machine learning classifier system used the trained neural network 310 (or other classifier) to identify portions of the images having the target terrain type (i.e., grass). Of course, the classifier can be trained to identify other types of terrain as well, such as types of landscaping such as mulch, rocks, dirt, concrete, pavement, etc.

Figure 16:
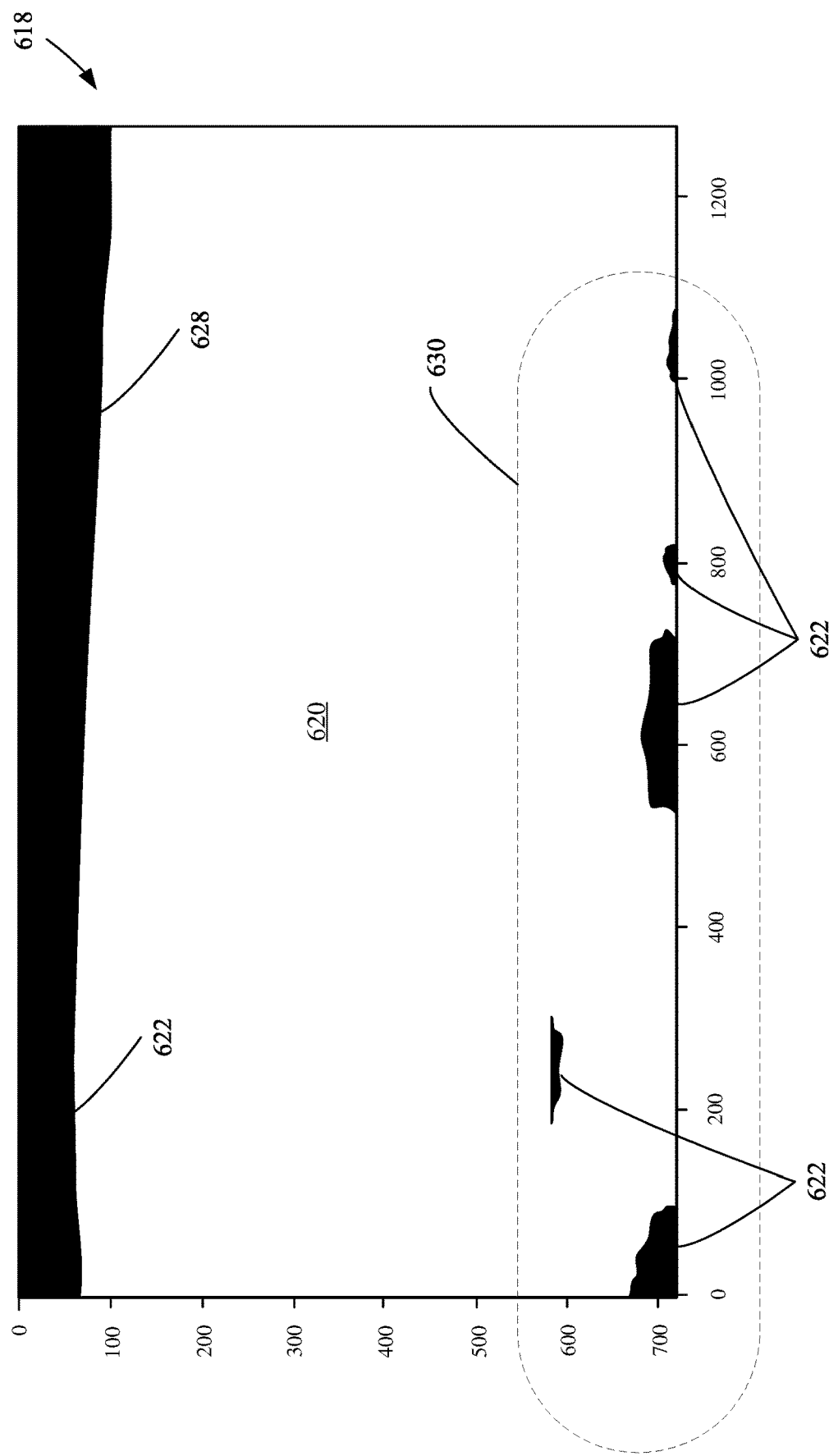
FIG. 16 illustrates an example semantic segmentation mask.

In one example of block 614, logic 318 uses semantic image segmentation to label pixels in the image(s). This is represented at block 616. One example of block 616 produces a semantic segmentation lawn mask 618, shown in FIG. 16. Here, mask 618 identifies areas of the target terrain 620 (i.e., grass), and non-terrain 622 (i.e., non-grass).

Figure 17:
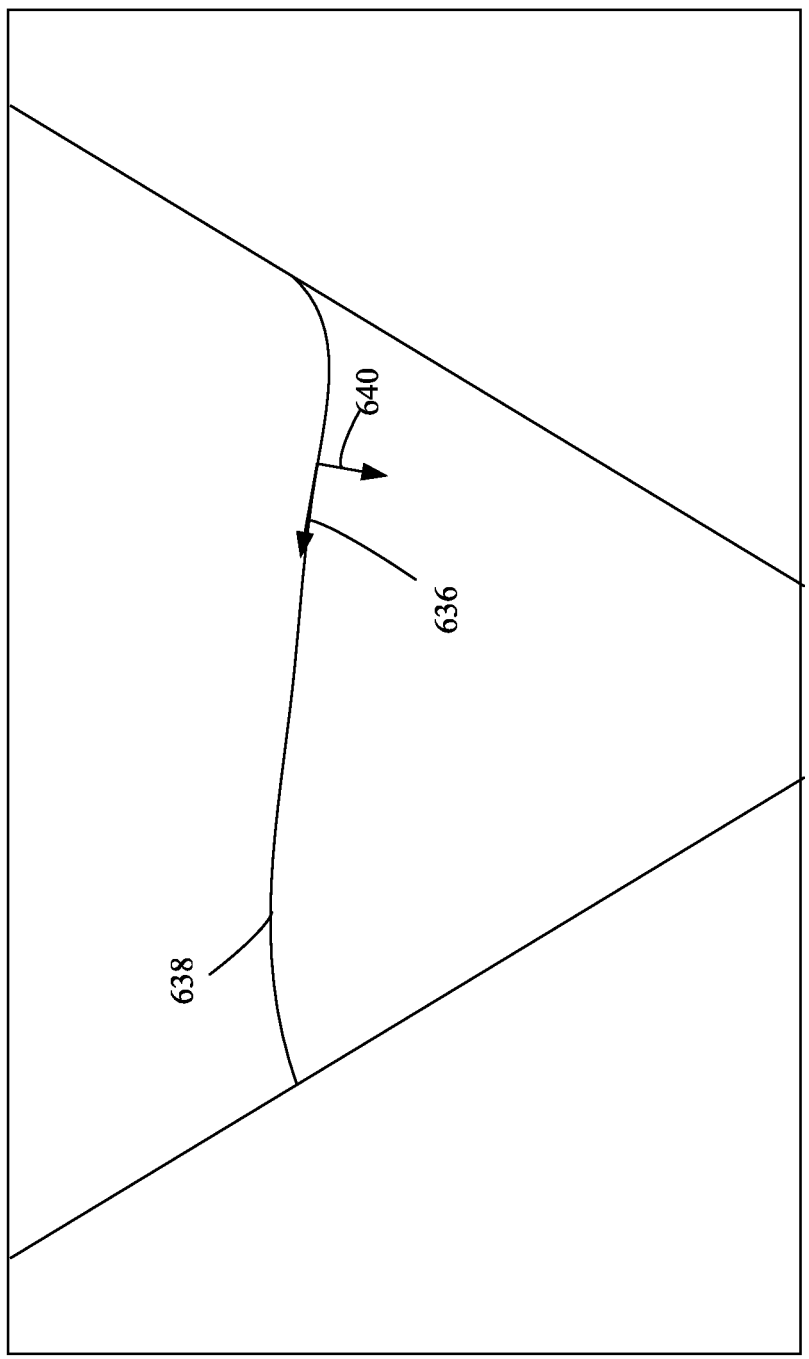
FIG. 17 illustrates an example relative projection.

At block 624, boundary data is generated that represents a boundary on the worksite based on the identified portions. In one example, this includes logic 320 performing boundary extraction, such as contouring the segmentation lawn mask 618. This is represented at block 626. For example, an edge 628 between the target terrain (lawn) and non-target terrain (non-grass) is eroded, blurred, and dilated to smooth the edge. The largest contour area is selected as the target area. Contouring can also include clipping the left, right, and/or bottom of the mask to account for edge artifacts. For example, contour clipping removes the artifacts represented within the dashed area 630 in FIG. 16. At block 632, logic 322 performs relative projection which transforms the border of the mask or image relative to the perspective of the camera. In the transformed perspective, the pixel space represents a distance in a plane of the mower (e.g., 7 pixels per inch, etc.). The bottom edge of the image is aligned with the center of the camera's sensor. An example relative projection is illustrated in FIG. 17.

At block 634, control vectors are generated from the relative projection. A boundary tangent vector 636 is oriented generally along the boundary path. In one example, the direction of the boundary tangent vector 636 is such that it fits to approximately 30% of the boundary points along the boundary line 638. A perpendicular vector 640 can also be determined, and is perpendicular to vector 636.

At block 642, the robotic mower is controlled within an operating area based on the boundary. For example, the robotic mower is controlled by control system 204 based on the control vectors generated at block 634. This is represented by block 644.

For example, the boundary tangent vector 636 and the perpendicular vector 640 can be linearly combined with weights depending on the distance of the robotic mower 202 to the boundary. As such, the resulting control vector is configured to drive towards the boundary at large distances (i.e., more weight is placed on the perpendicular vector) and to drive along the boundary at shorter distances (i.e., more weight is placed on the boundary tangent vector).

The control can be done in any of a variety of ways. For example, control system 204 can be configured to follow the boundary in a counter-clockwise direction (i.e., the boundary tangent vector is generated to be to the left relative to the direction of travel towards the boundary).

As noted above, boundary data can be defined in a number of ways. In accordance with one example of block 418, the robotic mower can receive multiple sets of boundary data and selectively use that boundary data in a preferential or ordered way. In one example, the robotic mower can first be controlled using boundary data generated by one or more of systems 304 and 306. That is, virtual worksite boundaries (e.g., a boundary map) 302 are received by control system 204. When control system 204 determines that robotic mower 202 is within a threshold distance of this boundary (e.g., within 10 feet, etc.), control system 204 can activate machine learning image classifier system 304 to begin acquiring and/or processing images through image capture components 211. Control system 204 can then utilize the boundary data generated by system 304 as it nears the boundary.

It can thus be seen that the present system provides a number of advantages. For example, the present system provides a boundary detection and control system for an autonomous machine, such as a robotic mower, and improves operation of the machine. This system accurately detects boundaries to constrain operation of the machine within an operating area on a worksite. This can prevent the machine from operating outside the desired area and increase operating efficiency of the machine, which can reduce the operating time and thus the power consumption, wear and tear on the machine, etc. Further, the present system does not require the use of physical boundary wires that are buried in the ground along the worksite, which is time consuming, increases costs, and requires disturbance of the soil.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 18:
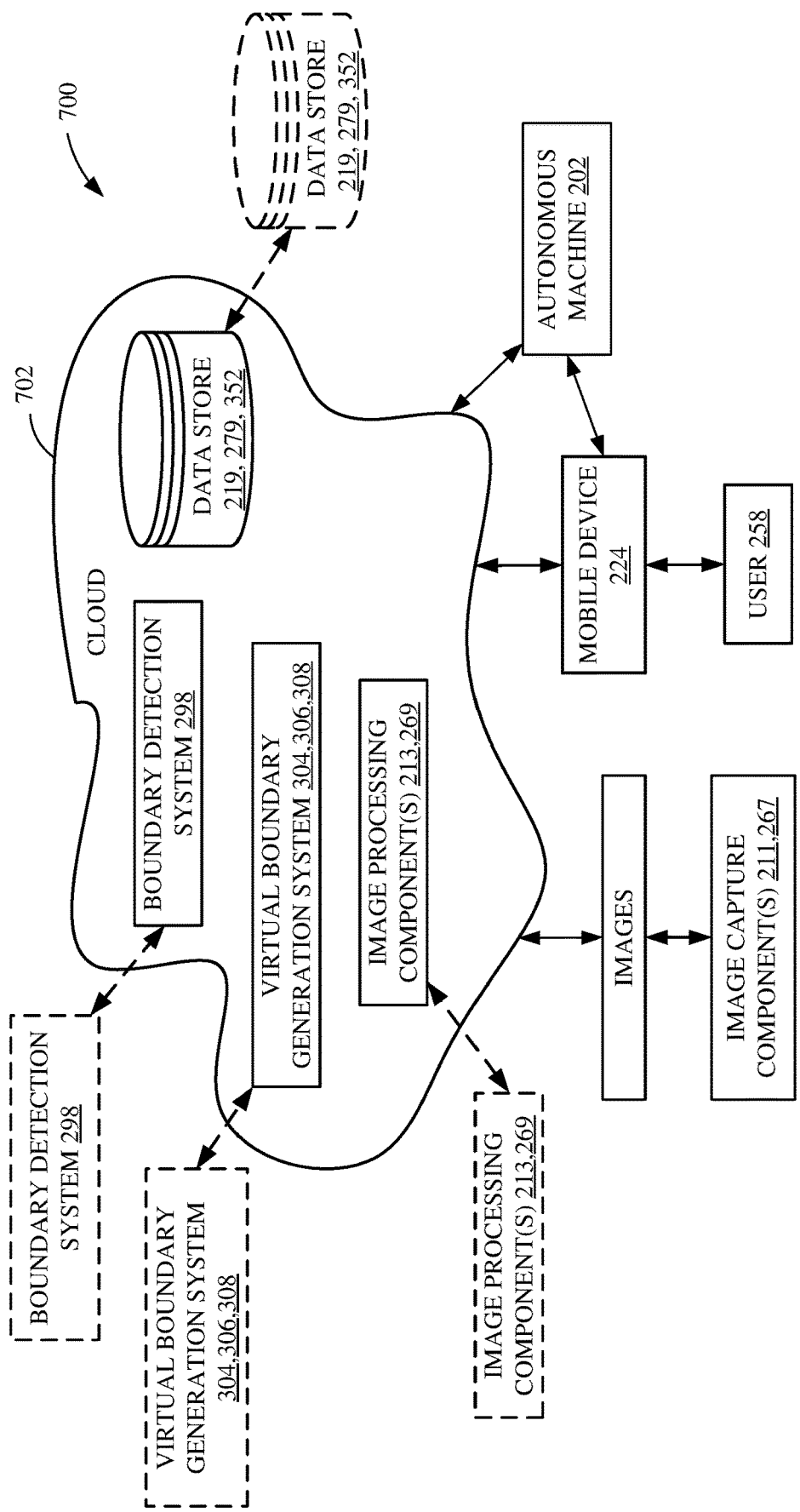
FIG. 18 is a block diagram showing one example of the architecture illustrated in FIG. 2, deployed in a remote server environment.

FIG. 18 is a block diagram of architecture 200, shown in FIG. 2, deployed in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 18, some items are similar to those shown in FIG. 2 and they are similarly numbered. FIG. 18 specifically shows that boundary detection system 298 can be located at a remote server location 702. Alternatively, or in addition, one or more of image processing components 213 and 269 can be located at the remote server location 702. Therefore, machine 202 and/or mobile device 224 access those systems through remote server location 702.

FIG. 18 also depicts another example of a remote server architecture. FIG. 8 shows that it is also contemplated that some elements of FIG. 2 are disposed at remote server location 702 while others are not. By way of example, system 298 and/or image processing component(s) 213/269 can be disposed at a location separate from location 702, and accessed through the remote server at location 702. Further, one or more of boundary generation systems 304, 306, and 308 can be disposed at a location separate from location 702, and accessed through the remote server at location 702. Further, one or more of data stores 219, 279, and 352 can be disposed at a location separate from location 702, and accessed through the remote server at location 702. Regardless of where they are located, they can be accessed directly by machine 202, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine can have an automated information collection system. As machine 202 comes close to the other machine, the system automatically collects the information from machine 202 or transfers information to machine 202 using any type of ad-hoc wireless connection. The collected information can then be forwarded to the main network as the other machine reaches a location where there is cellular coverage (or other wireless coverage). All of these architectures are contemplated herein. Further, the information can be stored on machine 202 until machine 202 enters a covered location. Machine 202, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 19:
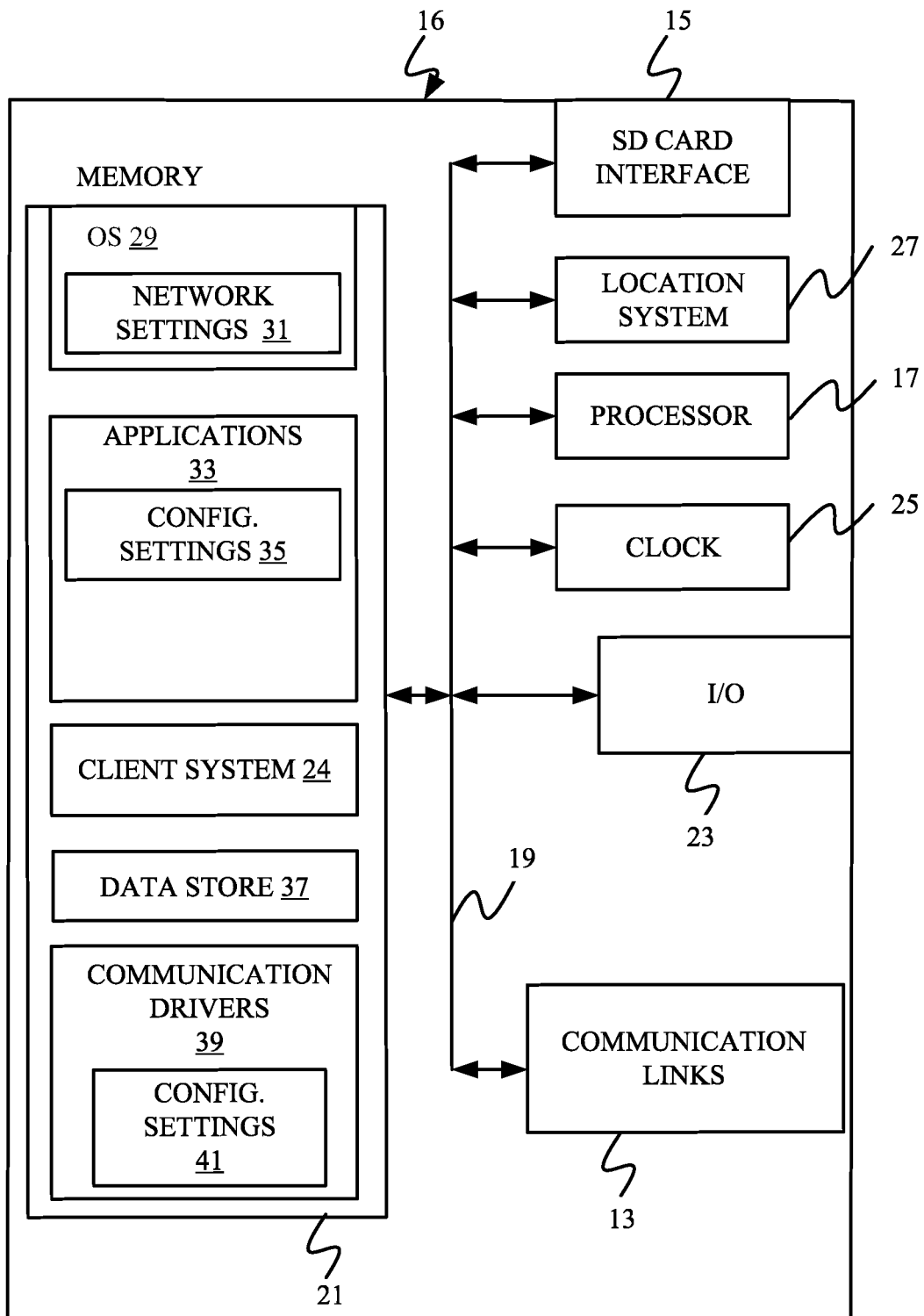
FIGS. 19-21 show examples of mobile devices that can be used in the architectures shown in the previous figures.
Figure 20:
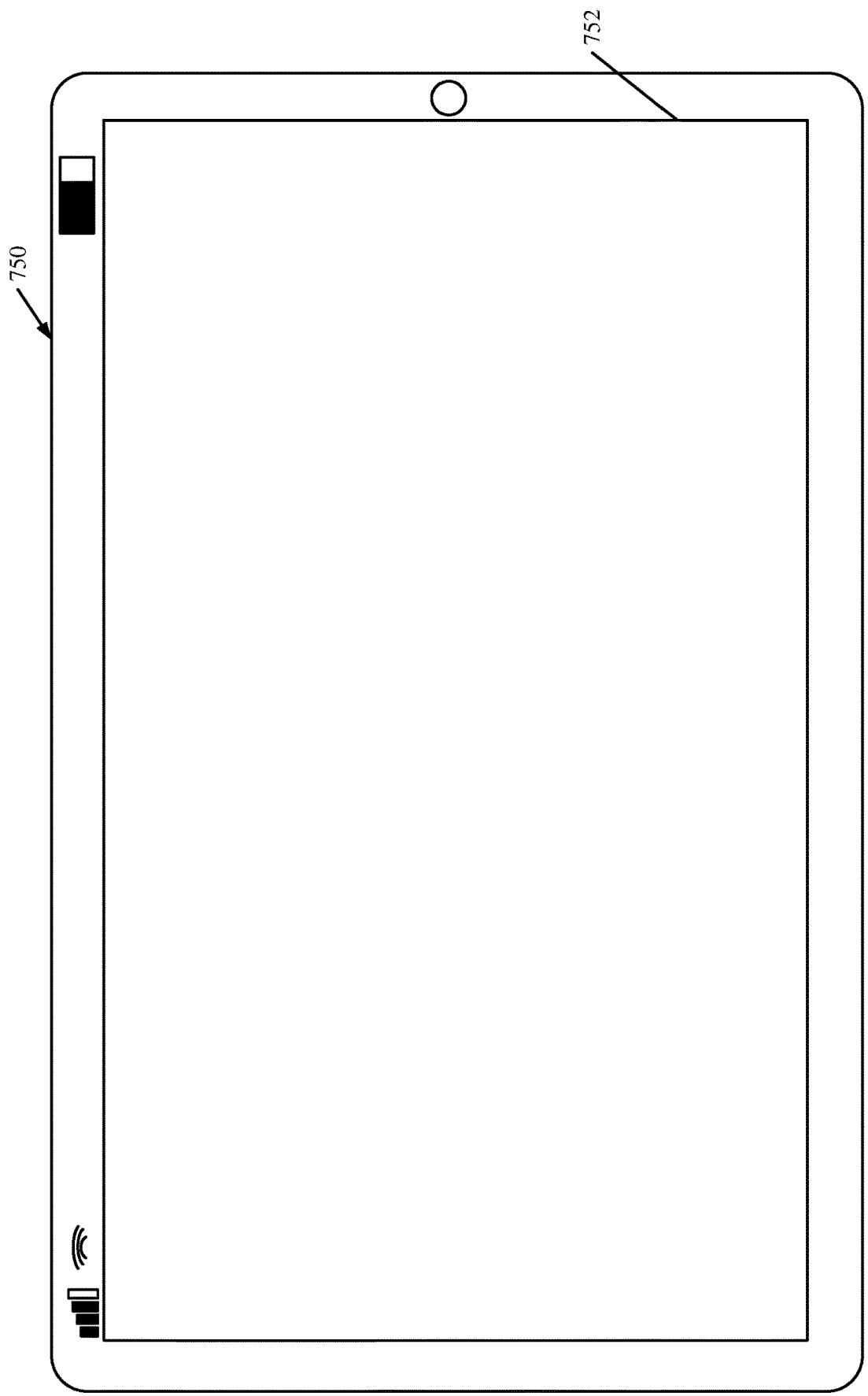
Figure 21:
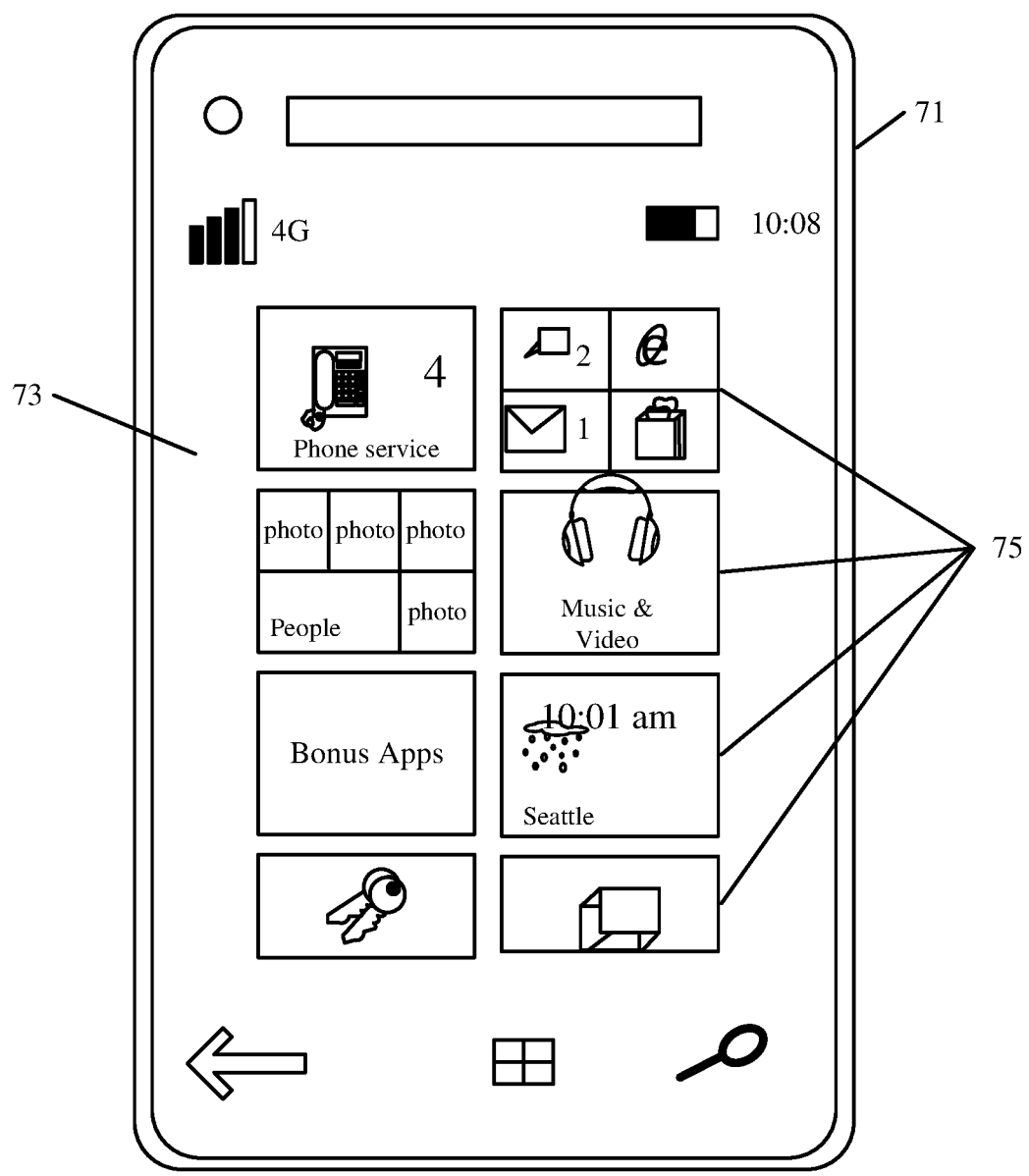

FIG. 19 is a simplified block diagram of one illustrative example of a handheld or mobile computing device that can be used as a user's or client's hand held device 16, in which the present system (or parts of it) can be deployed. FIGS. 20-21 are examples of handheld or mobile devices.

FIG. 19 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

VO components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 20 shows one example in which device 16 is a tablet computer 750. In FIG. 20, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 21 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 22:
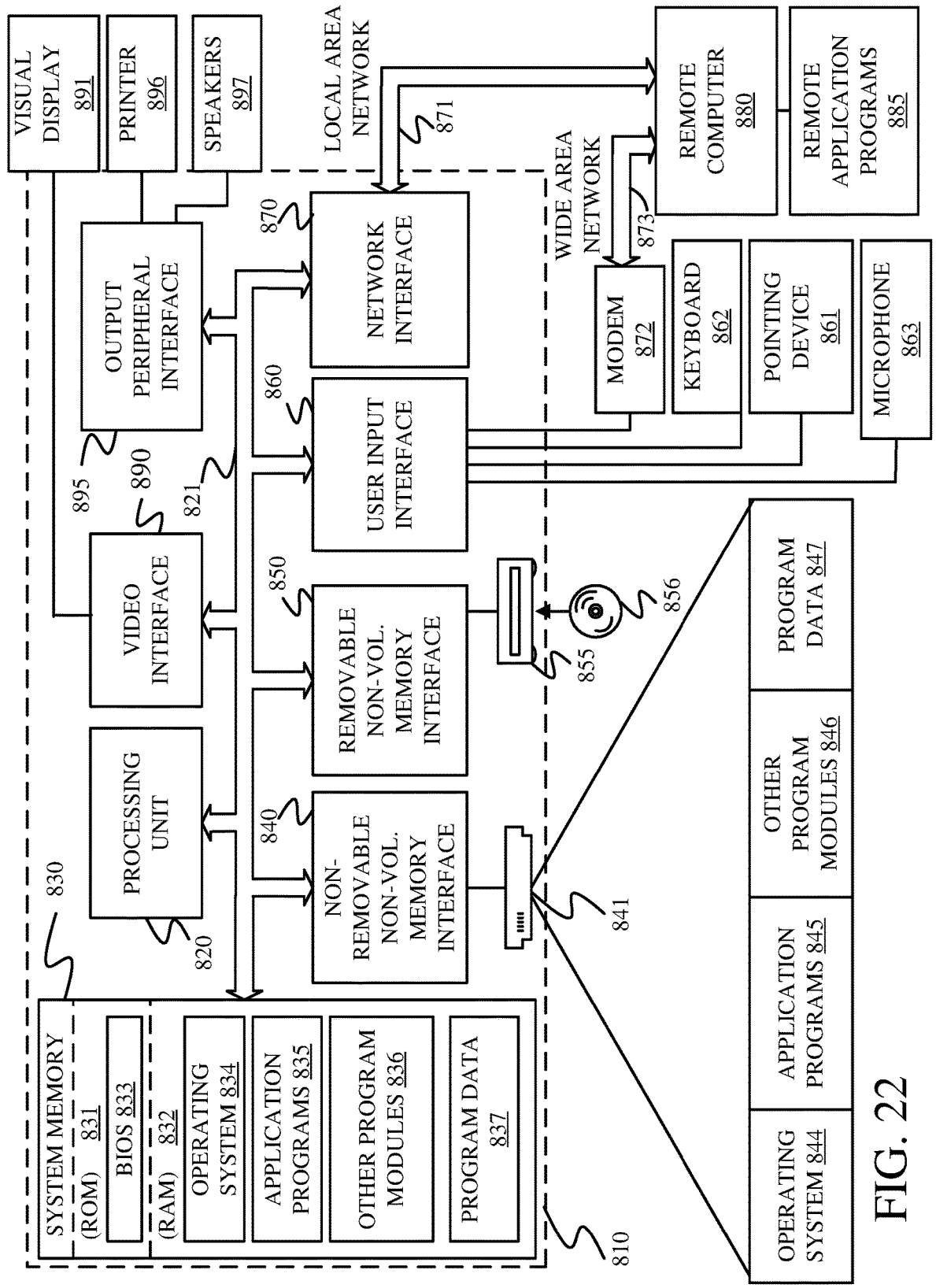
FIG. 22 is a block diagram showing one example of a computing environment that can be used in the architectures shown in the previous figures.

FIG. 22 is one example of a computing environment in which elements of FIG. 2, or parts of it, (for example) can be deployed. With reference to FIG. 22, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 22.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 22 illustrates operating system 834, application programs 835, other program modules 836, and program data 837.

The computer 810 may also include other removable/non-removable volatile/nonvolatile computer storage media. By way of example only, FIG. 22 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 22, provide storage of computer readable instructions, data structures, program modules and other data for the computer 810. In FIG. 22, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 22 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer-implemented method comprising:
  obtaining image data representing a set of images of a worksite captured by an image capture component of a mobile computing device;
  identifying a set of virtual markers associated with the set of images, each virtual marker having a corresponding position in one of the images;
  determining, for each virtual marker, a set of coordinates in a coordinate system based on the corresponding position of the virtual marker;
  based on the set of coordinates, generating boundary data that represents a boundary on the worksite; and
  communicating, to a robotic mower, the boundary data for control of the robotic mower within an operating area defined based on the boundary.

Example 2 is the computer-implemented method of any or all previous examples, wherein determining a set of coordinates for each virtual marker comprises:
  translating the corresponding position of the virtual marker into the set of coordinates.

Example 3 is the computer-implemented method of any or all previous examples, wherein translating comprises:
  receiving sensor data, associated with the virtual marker, from one or more sensors on the mobile computing device; and
  determining the set of coordinates for the virtual marker based on the sensor data.

Example 4 is the computer-implemented method of any or all previous examples, wherein the one or more sensors comprises at least one of:
  an accelerometer,
  a gyroscope, or
  a Global Navigation Satellite System (GNSS) receiver.

Example 5 is the computer-implemented method of any or all previous examples, wherein the set of coordinates for the virtual marker are determined using visual odometry.

Example 6 is the computer-implemented method of any or all previous examples, wherein the set of coordinates comprises local coordinates in a local coordinate system, and further comprising:
  transforming the local coordinates into global coordinates in a global coordinate system.

Example 7 is the computer-implemented method of any or all previous examples, wherein transforming comprises transforming each local coordinate into a corresponding global coordinate based on global coordinates associated with one or more reference points identified on the worksite.

Example 8 is the computer-implemented method of any or all previous examples, wherein the one or more reference points comprises at least two reference points each having corresponding global coordinates defined by Real-Time Kinematic (RTK) position enhancement of Global Positioning System (GPS) data.

Example 9 is the computer-implemented method of any or all previous examples, and further comprising:
  generating, on the mobile computing device, a user interface display that displays a field of view of the image capture component and includes a virtual marker user input mechanism actuatable to generate a virtual marker on a current image displayed in the user interface display; and
  generating the set of virtual markers based on user actuation of the virtual marker user input mechanism.

Example 10 is the computer-implemented method of any or all previous examples, and further comprising:
  generating a virtual marker modification user input mechanism actuatable to modify one or more of the virtual markers.

Example 11 is a computing system comprising:
  image acquisition logic configured to obtain image data representing a set of images of a worksite captured by an image capture component of a mobile computing device;
  virtual marker identification logic configured to identify a set of virtual markers associated with the set of images, each virtual marker having a corresponding position in one of the images;
  coordinate generation logic configured to determine, for each virtual marker, a set of coordinates in a coordinate system based on the corresponding position of the virtual marker;
  boundary generator logic configured to generate, based on the set of coordinates, boundary data that represents a boundary on the worksite; and
  a communication system configured to communicate, to a robotic mower, the boundary data for control of the robotic mower within an operating area defined based on the boundary.

Example 12 is the computing system of any or all previous examples, wherein the coordinate generation logic is configured to:
  receive sensor data, associated with the virtual marker, from one or more sensors on the mobile computing device; and determine the set of coordinates for the virtual marker based on the sensor data.

Example 13 is the computing system of any or all previous examples, wherein
the one or more sensors comprises at least one of an accelerometer, a gyroscope, or a Global Navigation Satellite System (GNSS) receiver, and
the set of coordinates for the virtual marker are determined using visual odometry.

Example 14 is the computing system of any or all previous examples, wherein the set of coordinates comprises local coordinates in a local coordinate system, and further comprising:
coordinate translation logic configured to:
transform the local coordinates into global coordinates in a global coordinate system based on global coordinates associated with one or more reference points identified on the worksite.

Example 15 is the computing system of any or all previous examples, and further comprising:
user interface logic configured to:
generate a user interface display that displays a field of view of the image capture component and includes a virtual marker user input mechanism actuatable to generate a virtual marker on a current image displayed in the user interface display; and
generate the set of virtual markers based on user actuation of the virtual marker user input mechanism.

Example 16 is a computer-implemented method of controlling a robotic mower, the method comprising:
obtaining image data representing one or more images of a worksite captured by an image capture component of the robotic mower;
identifying portions of the one or more images having a target terrain type using a machine-learning image classifier; and
generating boundary data that represents a boundary on the worksite based on the identified portions; and
controlling the robotic mower within an operating area defined based on the boundary data.

Example 17 is the computer-implemented method of any or all previous examples, wherein using the machine-learning image classifier comprises performing semantic image segmentation using a neural network trained with image training data, and generating the boundary data comprises generating a contour line between areas having the target terrain type and areas having a non-target terrain type.

Example 18 is the computer-implemented method of any or all previous examples, wherein the boundary data comprises first boundary data, and further comprising:
receiving second boundary data from a mobile computing device; and
defining the operating area based on the first boundary data and the second boundary data.

Example 19 is the computer-implemented method of any or all previous examples, wherein the second boundary data is generated by the mobile computing device based on user-defined virtual markers associated with images of the worksite.

Example 20 is the computer-implemented method of any or all previous examples, and further comprising:
receiving control instructions from the mobile computing device; and
controlling movement of the robotic mower along a path on the worksite based on the control instructions, wherein the second boundary data is indicative of a path.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
obtaining image data representing a set of images of a worksite captured by an image capture component of a mobile computing device that is separate from a robotic mower;
receiving sensor data generated by one or more sensors on the mobile computing device, the sensor data corresponding to the image data and representing a geographic position of the mobile computing device on the worksite and an orientation of the mobile computing device at the geographic position;
identifying a set of virtual markers associated with the set of images, each virtual marker having a corresponding position in a corresponding image in the set of images;
determining, for each virtual marker, a set of coordinates in a coordinate system based on the sensor data and the corresponding position of the virtual marker in the corresponding image;
based on the set of coordinates, generating boundary data that represents a boundary on the worksite; and
wirelessly communicating, to the robotic mower, the boundary data for control of the robotic mower within an operating area defined based on the boundary.

2. The method of claim 1, wherein determining a set of coordinates for each virtual marker comprises:
translating the corresponding position of the virtual marker into the set of coordinates.

3. The method of claim 2, wherein the set of coordinates comprises local coordinates in a local coordinate system, and further comprising:
transforming the local coordinates into global coordinates in a global coordinate system.

4. The method of claim 3, wherein transforming comprises transforming each local coordinate into a corresponding global coordinate based on global coordinates associated with one or more reference points identified on the worksite.

5. The method of claim 3, wherein the one or more reference points comprises at least two reference points each having corresponding global coordinates defined by Real-Time Kinematic (RTK) position enhancement of Global Positioning System (GPS) data.

6. The method of claim 1, wherein the set of coordinates are determined by performing visual odometry to track movement of the mobile computing device relative to the worksite.

7. The method of claim 2, wherein the visual odometry comprises concurrent odometry and mapping (COM).

8. The method of claim 1, and further comprising:
determining the orientation based on a sensor signal from at least one of:
an accelerometer on the mobile computing device, or a gyroscope on the mobile computing device; and
determining the geographic position based on a sensor signal from a Global Navigation Satellite System (GNSS) receiver on the mobile computing device.

9. The method of claim 1, and further comprising:
generating, on the mobile computing device, a user interface display that displays a field of view of the image capture component and includes a virtual marker user input mechanism actuatable to generate a virtual marker on a current image displayed in the user interface display; and
generating the set of virtual markers based on user actuation of the virtual marker user input mechanism.

10. The method of claim 9, and further comprising:
generating a virtual marker modification user input mechanism actuatable to modify one or more of the virtual markers.

11. The method of claim 1, and further comprising:
obtaining a particular image in the set of images;
receiving a virtual marker input associated with the particular image; and
based on the virtual marker input, selecting a position in the particular image and creating a virtual marker corresponding to the selected position in the particular image.

12. The method of claim 11, wherein the receiving the virtual marker input comprises receiving the virtual marker input through the mobile computing device.

13. A computing system comprising:
image acquisition logic configured to obtain image data representing a set of images of a worksite captured by an image capture component of a mobile computing device that is separate from a robotic mower;
virtual marker identification logic configured to identify a set of virtual markers associated with the set of images, each virtual marker having a corresponding position in a corresponding image in the set of images;
coordinate generation logic configured to determine, for each virtual marker, a set of coordinates in a coordinate system based on sensor data and the corresponding position of the virtual marker in the corresponding image, wherein the sensor data is generated by one or more sensors on the mobile computing device, corresponds to the image data, and represents a geographic position of the mobile computing device on the worksite and an orientation of the mobile computing device at the geographic position;
boundary generator logic configured to generate, based on the set of coordinates, boundary data that represents a boundary on the worksite; and
a communication system configured to wirelessly communicate, to the robotic mower, the boundary data for control of the robotic mower within an operating area defined based on the boundary.

14. The computing system of claim 13, wherein the set of coordinates are determined by performing, visual odometry to track movement of the mobile computing device relative to the worksite.

15. The computing system of claim 13, wherein
the one or more sensors comprises at least one of an accelerometer, a gyroscope, or a Global Navigation Satellite System (GNSS) receiver.

16. The computing system of claim 13, wherein the set of coordinates comprises local coordinates in a local coordinate system, and further comprising:
coordinate translation logic configured to:
transform the local coordinates into global coordinates in a global coordinate system based on global coordinates associated with one or more reference points identified on the worksite.

17. The computing system of claim 16, and further comprising:
user interface logic configured to:
generate a user interface display that displays a field of view of the image capture component and includes a virtual marker user input mechanism actuatable to generate a virtual marker on a current image displayed in the user interface display; and
generate the set of virtual markers based on user actuation of the virtual marker user input mechanism.

18. The computing system of claim 13, and further comprising:
virtual marker generator logic configured to:
receive a virtual marker input associated with a particular image in the set of images; and
based on the virtual marker input, select a position in the particular image and create a virtual marker corresponding to the selected position in the particular image.

19. The computing system of claim 18, wherein the virtual marker input is received through the mobile computing device.

20. A mobile computing device comprising:
a display device;
an image capture component configured to capture an image of a worksite;
one or more sensors configured to generate sensor data representing an orientation of the image capture component relative to the worksite;
a communication system configured to wirelessly communicate with a robotic mower;
at least one processor; and
memory storing instructions executable by the at least one processor, wherein the instructions, when executed, provide:
an augmented reality virtual boundary generation system configured to:
generate a user interface display on the display device that displays a field of view of the image capture component and includes a virtual marker user input mechanism;
generate a virtual marker based on user actuation of the virtual marker user input mechanism;
determine a location of the virtual marker in the field of view;
determine a set of coordinates for the virtual marker in a coordinate system based on the location of the virtual marker and the sensor data; and
based on the set of coordinates, generate boundary data that represents a boundary on the worksite;
wherein the communication system is configured to wirelessly communicate, to the robotic mower, the boundary data for control of the robotic mower within an operating area defined based on the boundary.

* * * * *